United States Patent
Neves et al.

(10) Patent No.: US 11,662,998 B2
(45) Date of Patent: May 30, 2023

(54) DETECTING DUPLICATED CODE PATTERNS IN VISUAL PROGRAMMING LANGUAGE CODE INSTANCES

(71) Applicant: OutSystems—Software em Rede, S.A., Linda-a-Velha (PT)

(72) Inventors: Miguel Ângelo Da Terra Neves, Lisbon (PT); António Manuel de Carvalho dos Santos Alegria, Lisbon (PT); João Pedro Nunes Nadkarni, Faro (PT); Pedro Tomás Mendes Resende, Lisbon (PT); Miguel Monteiro Ventura, Cascais (PT)

(73) Assignee: OutSystems—Software em Rede, S.A.

( * ) Notice: Subject to any disclaimer, the term of this patent is extended or adjusted under 35 U.S.C. 154(b) by 0 days.

(21) Appl. No.: 17/350,362

(22) Filed: Jun. 17, 2021

(65) Prior Publication Data

US 2022/0137959 A1    May 5, 2022

Related U.S. Application Data

(60) Provisional application No. 63/117,899, filed on Nov. 24, 2020, provisional application No. 63/117,895, (Continued)

(51) Int. Cl.
    *G06F 8/75*    (2018.01)
    *G06F 8/34*    (2018.01)
    (Continued)

(52) U.S. Cl.
    CPC .......... *G06F 8/75* (2013.01); *G06F 8/34* (2013.01); *G06F 8/423* (2013.01); *G06F 8/433* (2013.01);
    (Continued)

(58) Field of Classification Search
    CPC ............ G06F 8/72; G06F 8/433; G06F 8/423; G06F 8/34; G06F 40/284; G06F 16/319; G06F 8/75
    See application file for complete search history.

(56) References Cited

U.S. PATENT DOCUMENTS

| 8,584,088 B1* | 11/2013 | Carrick | ............ G06F 8/74 717/124 |
| 2016/0378445 A1* | 12/2016 | Kashiwagi | ............ G06F 8/42 717/143 |

(Continued)

OTHER PUBLICATIONS

Stolee et al., "Identification, Impact, and Refactoring of Smells in Pipe-Like Web Mashups" (Year: 2013).*
(Continued)

*Primary Examiner* — Phillip H Nguyen
(74) *Attorney, Agent, or Firm* — Van Pelt, Yi & James LLP

(57) ABSTRACT

In various embodiments, a process for detecting duplicated code patterns in visual programming language code instances includes analyzing a repository of graph based visual programming language code instances and detecting a similar code portion pattern duplicated among a group of graph based visual programming language code instances included in the repository of graph based visual programming language code instances including by using an index and tokenizing a flow corresponding to at least one graph based visual programming language code instance in the group of graph based visual programming language code instance. The process includes visually indicating elements belonging to the detected similar code portion pattern within a visual representation of at least one of the group of graph based visual programming language code instances.

20 Claims, 10 Drawing Sheets

Related U.S. Application Data filed on Nov. 24, 2020, provisional application No. 63/110,330, filed on Nov. 5, 2020.

(51) Int. Cl.
*G06F 8/72* (2018.01)
*G06F 40/284* (2020.01)
*G06F 8/41* (2018.01)
*G06F 16/31* (2019.01)

(52) U.S. Cl.
CPC .............. *G06F 8/72* (2013.01); *G06F 16/319* (2019.01); *G06F 40/284* (2020.01)

(56) References Cited

U.S. PATENT DOCUMENTS

2019/0079853 A1* 3/2019 Makkar ...................... G06F 8/36
2020/0218535 A1* 7/2020 Alomari .................. G06F 8/425

OTHER PUBLICATIONS

Browne et al., "Visual Programming and Parallel Computing" (Year: 1994).*
Xie et al., "DeepVisual: A Visual Programming Tool for Deep Learning Systems" (Year: 2019).*
Hermans et al., "Smells in Block-Based Programming Languages" (Year: 2016).*
Sylvestre Ledru, "Making the Building of Firefox Faster for You with Clever-Commit from Ubisoft", from <https://blog.mozilla.org/futurereleases/2019/02/12/making-the-building-of-firefox-faster-for-you-with-clever-commit-from-ubisoft/>, Feb. 12, 2019.
Tadeu Zagallo, Neal, Uber's Open Source Language-Agnostic Linting Platform, uber.com, pp. 1-6, Jan. 31, 2018.
Tingting Chang, "Using OpenCV to transform screen designs into low-fi block designs", from <https://medium.com/pushtostart/lo-fi-transformer-a3c65eeae70>, Mar. 19, 2019.
Tony Beltramelli, "pix2code: Generating Code from a Graphical User Interface Screenshot", Sep. 19, 2017.
Tunaki et al., Where is the Sonar "Duplicated Code" here?, Stack Overflow, Mar. 2017.
Uri Alon et al., "code2vec: Learning Distributed Representations of Code", Oct. 30, 2018.
William Blum, "Neural Fuzzing: applying DNN to software security testing", from <https://www.microsoft.com/en-us/research/blog/neural-fuzzing/>, Nov. 13, 2017.
Zann Yap, "Intelligent Automations with Machine Learning and AI", Jul. 18, 2017, retrieved from <https://product.workato.com/recipe-iq-intelligent-automations/> on Jun. 8, 2021.
Abhishek Pradhan, "Codota—An AI coding partner", Aug. 3, 2017, retrieved from <https://medium.com/lingvo-masino/codota-an-ai-coding-partner-6fb198381a61 > on Jun. 8, 2021.
Akshat Sharma, "6 ways Quizzes in Google Forms are getting smarter", published May 10, 2018, retrieved from <https://blog.google/outreach-initiatives/education/6-ways-quizzes-google-forms-are-getting-smarter/> on May 17, 2021.
Alalfi et al., Models are Code too: Near-miss Clone Detection for Simulink Models, School of Computing, Queen's University, IEEE 2012.
Alex Wilhelm, "MonkeyLearn raises $2.2M to build out its no-code AI text analysis service", from <https://techcrunch.com/2020/07/07/monkeylearn-raises-2-2m-to-build-out-its-no-code-ai-text-analysis-service/>, Jul. 7, 2020.
Aman Mittal, "How to Create a Chatbot with Dialogflow, NodeJS, and Webhooks", from <https://medium.com/crowdbotics/how-to-create-a-chatbot-with-dialogflow-nodejs-and-webhooks-eecbbce97d8b>, Jul. 19, 2019.
Amanda Silver, Introducing Visual Studio IntelliCode, Microsoft DevBlogs, pp. 1-5, May 7, 2018.
Andrey Chepstov, "Enjoying Java and Being More Productive with IntelliJ IDEA", Mar. 3, 2016, retrieved from <https://blog.jetbrains.com/idea/2016/03/enjoying-java-and-being-more-productive-with-intellij-idea/> on Jun. 8, 2021.
Anne Gao, "Intelligent Visual Studio Search Service", Mar. 2, 2021, retrieved from <https://devblogs.microsoft.com/visualstudio/intelligent-visual-studio-search-service/> on Jun. 8, 2021.
Audemard et al., Improving Glucose for Incremental SAT Solving with Assumptions: Application to MUS Extraction, 2013.
Author Unknown, "A bot disguised as a human software developer fixes bugs", by Emerging Technology from the arXiv, Oct. 23, 2018.
Author Unknown, "Appvance.ai Launches Appvance IQ", Apr. 4, 2018.
Author Unknown, "DeepCode boosts its intelligence and can now explain the reasons behind coding errors", Oct. 7, 2019, retrieved from: <https://www.deepcode.ai/blog/deepcode-boosts-its-intelligence-and-can-now-explain-the-reasons-behind-coding-errors> on Jun. 8, 2021.
Author Unknown, "Facebook/infer: Infer version v1.0.0", Oct. 12, 2020.
Author Unknown, "Firedrop AI: The machine that will build your next website", retrieved from <https://medium.com/@firedrop/the-machine-that-will-build-your-next-website-90e476241836> on Jun. 8, 2021; published Jun. 1, 2016.
Author Unknown, "QVscribe Launches Latest Engineering Analysis Tool", from <https://innovacorp.ca/news/qvscribe-launches-latest-engineering-analysis-tool>, Feb. 8, 2017.
Author Unknown, "Randoop Manual", from <https://randoop.github.io/randoop/manual/>, May 3, 2020.
Author unknown, "ServiceNow to Acquire Loom Systems", from <https://www.servicenow.com/company/media/press-room/servicenow-to-acquire-loom-systems.html>, Jan. 22, 2020.
Author unknown, "Tutorial 1: Dynatrace—Application Performance Monitoring (APM) Tool", from <https://medium.com/knoldus/tutorial-1-dynatrace-application-performance-monitoring-apm-tool-2f97ec2830a6>, Apr. 12, 2017.
Author Unknown, "Using Flash Fill in Excel", from <https://support.microsoft.com/en-us/office/using-flash-fill-in-excel-3f9bcf1e-db93-4890-94a0-1578341f73f7>, Nov. 12, 2020.
Author Unknown, "Wikipedia: AppSheet", retrieved from <https://en.wikipedia.org/w/index.php?title=AppSheet&oldid=976348103> on Jun. 8, 2021; published Sep. 2, 2020.
Author unknown, "ZEOS: Why Our Zero-code Environment Will Work for You", Apr. 28, 2020.
Author Unknown, MxAssist Performance Bot, Mendix Docs, Mar. 18, 2021.
Author Unknown, Process Model AI-Augmented Development, Appian 20.3, Sep. 14, 2020.
Author Unknown,"xgdsmileboy / SimFix", retrieved from <https://github.com/xgdsmileboy/SimFix/blob/master/README.md> on Jun. 8, 2021, published May 28, 2019.
Bader et al., "Getafix: Learning to Fix Bugs Automatically", Proc. ACM Program. Lang., vol. 3, No. OOPSLA, Article 159. Oct. 2019.
Bahiense et al., Discrete Applied Mathematics, Elsevier B.V., pp. 2523-2541, 2012.
Balazinska et al., Measuring Clone Based Reengineering Opportunities, Academia, pp. 1-12, 1999.
Barr et al., "The Oracle Problem in Software Testing: A Survey", IEEE Transactions on Software Engineering, vol. 41, No. 5, May 2015.
Barrow et al., Subgraph Isomorphism, Matching Relational Structures and Maximal Cliques, Information Processing Letters, vol. 4, No. 4, pp. 83-84, Jan. 1976.
Baxter et al., Clone Detection Using Abstract Syntax Trees, IEEE, pp. 1-10, 1998.
Bielik et al., "Robust Relational Layout Synthesis from Examples for Android", Proc. ACM Program. Lang., vol. 2, No. OOPSLA, Article 156. Nov. 2018.
Bilal Haidar, "Applitools—The automated visual regression testing framework", from <Jun. 9, 2021 Applitools—The automated visual regression testing framework | by This Dot Media | Medium https://medium.com/@thisdotmedia/applitools-the-automated-visual-regression-testing-framework-18ebada47977>, Oct. 25, 2018.

(56) References Cited

OTHER PUBLICATIONS

Brenda S. Baker, On Finding Duplication and Near-Duplication in Large Software Systems, IEEE, pp. 86-95, 1995.
Brenda S. Baker, Parameterized Duplication in Strings: Algorithms and an Application to Software Maintenance, ACM Symposium, 1993.
C. Williams, "Putting AI bots to the test: Test.ai and the future of app testing", Assignment: Value Creation with AI, Dec. 4, 2019.
Celeste Barnaby, "Aroma: Using machine learning for code recommendation", Apr. 4, 2019, retrieved from <https://ai.facebook.com/blog/aroma-ml-for-code-recommendation/> on Jun. 8, 2021.
Chaoji et al., An Integrated, Generic Approach to Pattern Mining: Data Mining Template Library, Springer Science +Business Media LLC, 2007.
Cook et al., Graph-based Data Mining, IEEE Intelligent Systems, pp. 32-41, 2000.
Cordy et al., The NiCad Clone Detector, 2011.
Deissenboeck et al., Clone Detection in Automotive Model-Based Development, ICSE, pp. 603-612, May 2008.
Deissenboeck et al., Code Clone Detection in Practice, International Conference on Software Engineering, Jan. 2010.
Deissenboeck et al., Model Clone Detection in Practice, IWSC, pp. 57-64, May 2010.
Ducasse et al., A Language Independent Approach for Detecting Duplicated Code, York University, 1999.
Emil Protalinski, "Dry.io wants to democratize software development using AI", from <https://venturebeat.com/2019/02/26/dry-io-wants-to-democratize-software-development-using-ai/>, Feb. 26, 2019.
Feng et al., "Program Synthesis using Conflict-Driven Learning", Nov. 21, 2017.
Feng et al., Automated Synthesis of Semantic Malware Signatures Using Maximum Satisfiability, NDSS, pp. 1-15, Mar. 2017.
Feng et al., NiCad+: Speeding the Detecting Process of NiCad, IEEE SOSE, pp. 103-110, 2020.
Gina Baldassarre, "Stratejos helps teams manage daily admin and coordination of projects", Jul. 17, 2018.
Henning Femmer, "Requirements Quality Defect Detection with the Qualicen Requirements Scout", 2018.
Ignatiev, et al., PySAT: A Python Toolkit for Prototyping with SAT Oracles, pp. 1-9, 2018.
Inokuchi et al., An Apricot-Based Algorithm for Mining Frequent Substructures from Graph Data, PKDD, pp. 13-23, 2000.
J Howard Johnson, Substring Matching for Clone Detection and Change Tracking, NRC 38301, 1994.
Jain et al., "Sketch2Code: Transformation of Sketches to UI in Real-time Using Deep Neural Network", Oct. 20, 2019.
Jason Warner, Introducing the Checks API, a better way to connect integrations and code, The GitHub Blog, pp. 1-7, May 7, 2018.
Jeremias Rößer, "recheck and the "Git for the GUI"", Excerpt from PNSQC Proceedings, Aug. 2020.
Jiang et al., Deckard: Scalable and Accurate Tree-based Detection of Code Clones, Singapore Management University, ICSE, 2007.
JS Nice, "Statistical renaming, Type inference and Deobfuscation", Mar. 2018.
Kamiya et al., CCFinder: A Multilinguistic Token-Based Code Clone Detection System for Large Scale Source Code, IEEE Transactions on Software Engineering, vol. 28, No. 7, pp. 654-670, Jul. 2002.
Kasper et al., Supporting the Analysis of Clones in Software Systems: A Case Study, Journal of Software Maintenance and Evolution: Research and Practice, 2005.
Ke Mao, "Sapienz technology leverages automated test design to make the testing process faster, more comprehensive, and more effective.", from <https://engineering.fb.com/2018/05/02/developer-tools/sapienz-intelligent-automated-software-testing-at-scale/>, May 2, 2018.
Kelly Kirkham, "9 Incredible AI Powered Tools to Help Developers Work Smarter", from <https://blog.100tb.com/9-incredible-ai-powered-tools-to-help-developers-work-smarter>, Mar. 19, 2018.

Kevin Hart, "Revuze, turn any textual customer opinion to deep BI automatically", from <https://medium.com/petacrunch/revuze-turn-any-textual-customer-opinion-to-deep-bi-automatically-c538decad944>, Sep. 3, 2019.
Komondoor et al, Using Slicing to Identify Duplication in Source Code, 2001.
Koshimura et al., QMaxSAT: A Partial Max-SAT Solver, Journal on Satisfiability, Boolean Modeling and Computation 8, pp. 95-100, 2012.
Krinke et al., Identifying Similar Code with Program Dependence Graphs, IEEE, pp. 301-309, 2001.
Kyle Wiggers, "Google acquires AI customer service startup Onward", from <https://venturebeat.com/2018/10/02/google-acquires-onward-an-ai-customer-service-startup/>, Oct. 2, 2018.
Li et al., CP-Miner: A Tool for Finding Copy-paste and Related Bugs in Operating System Code, USENIX OSDI, pp. 289-302, 2004.
Liam Tung, "As google enters AI coding autocomplete race, Kite for Python language gets smarter", Sep. 24, 2019, retrieved from <https://www.zdnet.com/article/as-google-enters-ai-coding-autocomplete-race-kite-for-python-language-gets-smarter/> on Jun. 8, 2021.
Liang et al., A Novel Optimized Path-Based Algorithm for Model Clone Detection, Journal of Software, vol. 9, No. 7, pp. 1810-1817, 2014.
Liu et al., A Learning Based Branch and Bound for Maximum Common Subgraph Related Problems, 34th AAAI Conference on Artificial Intelligence, pp. 2392-2399, 2020.
Liu et al., GPLAG: Detection of Software Plagiarism by Program Dependence Graph Analysis, KIDD, pp. 872-881, 2006.
Mabl, "Maintenance-Free Automated Functional Testing with Auto-Healing Tests", from <https://medium.com/hackernoon/maintenance-free-automated-functional-testing-with-auto-healing-tests-f395cd5857fc>, Feb. 26, 2018.
Marginean et al., "SapFix: Automated End-to-End Repairat Scale", Feb. 2019.
Markovtsev et al., Splitting Source Code Identifiers Using Bidirectional LSTM Recurrent Neural Network, ML4P, 2018.
Mayrand et al., Experiment on the Detection of Function Clones in a Software System Using Metrics, IEEE, pp. 244-253, 1996.
McCreesh et al., A Partitioning Algorithm for Maximum Common Subgraph Problems, 2017.
McCreesh et al., Clique and Constraint Models for Maximum Common (Connected) Subgraph Problems, HAL archives, Jun. 15, 2016.
Mike Butcher, "Engineer.ai launches its Builder Now platform for rapid app prototyping and building", from <https://techcrunch.com/2019/11/25/engineer-ai-launches-its-builder-now-platform-for-rapid-app-prototyping-and-building/>, Nov. 25, 2019.
Mix, "Airbnb built an AI that turns design sketches into product source code", from <https://thenextweb.com/news/airbnb-ai-sketches-design-code>, Oct. 25, 2017.
Morgado et al., Core-Guided MaxSAT with Soft Cardinality Constraints, CP, 2014.
Morgado et al., Iterative and core-guided MaxSAT solvingL a survey and assessment, Springer Science, pp. 179-534, Jul. 20, 2013.
Namita Prabhu, "Can you build an integration pipeline for me?", from <https://www.snaplogic.com/blog/iris-integration-assistant>, published May 25, 2017.
Neves et al., Exploiting Resolution-based Representations for MaxSAT Solving, Retrieved from arXiv:1505.02405v1, pp. 1-15, May 10, 2015.
Nijssen et al., A Quickstart in Frequent Structure Mining Can Make a Difference, Research Track Poster, KDD, pp. 347-652, Aug. 2004.
NILS Gode, Incremental Clone Detection, University of Bremen, Sep. 2008.
Park et al., Deriving Common Malware Behavior Through Graph Clustering, ASIACCS, pp. 497-502, 2011.
Patenaude et al., Extending Software Quality Assessment Techniques to Java Systems, 1999.

(56) References Cited

OTHER PUBLICATIONS

Paul Lambert, "Subject: Write emails faster with Smart Compose in Gmail", published May 8, 2018, retrieved from <https://www.blog.google/products/gmail/subject-write-emails-faster-smart-compose-gmail/> on May 17, 2021.

Pham et al., Complete and Accurate Clone Detection in Graph-based Models, IEEE, pp. 276-286, May 2009.

Pradel et al., "DeepBugs: A Learning Approach to Name-Based Bug Detection", Proc. ACM Program. Lang., vol. 2, No. OOPSLA, Article 147. Nov. 2018.

Raghothaman et al., "DIFFLOG: Beyond Deductive Methods in Program Analysis", 2018.

Ragkhitwetsagul et al., Siamese: Scalable and Incremental Code Clone Search via Multiple Code Representations, Empirical Software Engineering, 2019.

Rani Horev, Explained: Multilingual Sentence Embeddings for Zero-Shot Transfer, Towards Data Science, Jan. 6, 2019.

Rattan et al., Software Clone Detection: A Systematic Review, Information and Software Technology 55, pp. 1165-1199, 2013.

Rory Dickenson, "AI for Enterprise Customer Service: It's All In The Data", from <https://medium.com/ultimate-ai/https-medium-com-ultimate-ai-ai-for-enterprise-customer-service-clustering-64571bfcbdb3>, Nov. 27, 2018.

Sadowski et al., Lessons from Building Static Analysis Tools at Google, Communications of the ACM, pp. 1-11, Apr. 2018.

Seoul Engineer, Paper Review: 'Lessons from Building Static Analysis Tools at Google', sourcedtech, May 6, 2018.

Soliudeen Ogunsola, "Getting Started with TeleportHQ", from <https://medium.com/visualdevspace/getting-started-with-teleporthq-53a671ec56d5> May 12, 2020.

Sonia Kim, "Neural Code Search: ML-based code search using natural language queries", from <https://ai.facebook.com/blog/neural-code-search-ml-based-code-search-using-natural-language-queries/>, Jun. 24, 2019.

Sukharev et al., Assisted code review, running custom code analyzers on pull requests, Oct. 10, 2019.

* cited by examiner

Report

| Apps | Modules | Category | Findings | Users | | |
|---|---|---|---|---|---|---|
| All applications ▼ | All modules ▼ | All ▼ | Opened ▼ | All ▼ | ↓≡ | |
| Visible disabled Button | | | Security | 9 | | |
| Not taking advantage of Local Storage | | | Performance | 3 | | |
| Image widgets without width | | | Performance | 12 | | |
| Inline JavaScript | | | Performance | 4 | | |
| Large Session Variable | | | Performance | 4 | | |
| Too much disabled code | | | Maintainability | 14 | | |
| Duplicated Code | | | Maintainability | 291 > | | |
| Inadequate data preparation | | | Performance | 1 | | |
| Prefix Timer actions | | | Maintainability | 30 | | |

Duplicated Code
Duplicated Code

Impact +

How to Fix +

Patterns
- Pattern #1: 36 duplicates
- Pattern #2: 57 duplicates
- Pattern #3: 19 duplicates
- Pattern #4: 65 duplicates
- Pattern #5: 8 duplicates
- Pattern #6: 2 duplicates
- Pattern #7: 11 duplicates
- Pattern #8: 7 duplicates
- Pattern #9: 3 duplicates Latest sync on Sep 9, 2020, 03:01:08 AM (UTC)

Export to Excel

FIG. 9

DETECTING DUPLICATED CODE PATTERNS IN VISUAL PROGRAMMING LANGUAGE CODE INSTANCES

CROSS REFERENCE TO OTHER APPLICATIONS

This application claims priority to U.S. Provisional Patent Application No. 63/110,330 entitled ANALYZING, IDENTIFYING, AND PREDICTING CODE FOR MACHINE-ASSISTED COMPUTER PROGRAMMING filed Nov. 5, 2020, U.S. Provisional Patent Application No. 63/117,895 entitled MACHINE-ASSISTED COMPUTER PROGRAMMING filed Nov. 24, 2020, and U.S. Provisional Patent Application No. 63/117,899 entitled MACHINE-ASSISTED COMPUTER PROGRAMMING filed Nov. 24, 2020, all of which are incorporated herein by reference for all purposes.

BACKGROUND OF THE INVENTION

Technical debt refers to the cost of reworking or updating computer program code. A computer program typically includes interrelated modules and making a change to one module may involve making corresponding changes to other modules. One type of technical debt is duplicated code. For example, what is essentially the same function or rule may be implemented by duplicate/similar versions of code written by different developers. Duplicated code may lead to issues when running applications in production, as well as make the development process as a whole take longer. This is due to the fact that typically whenever a change is made to a piece of code that is replicated somewhere else, the same change has to be applied for its replications as well. During this process, developers may miss some instances of the duplication (possibly introducing bugs) and/or they have to change all of the instances, instead of a single, reference one—making the entire process more time consuming than necessary. In addition, a bug present in one code instance would also be expected to affect a duplicated code instance. Effectively and efficiently identifying duplicated code could reduce technical debt and thereby increase the maintainability of code.

BRIEF DESCRIPTION OF THE DRAWINGS

Various embodiments of the invention are disclosed in the following detailed description and the accompanying drawings.

FIG. 9 is a diagram illustrating an example of an architecture dashboard obtained in some embodiments.

DETAILED DESCRIPTION

Figure 1:
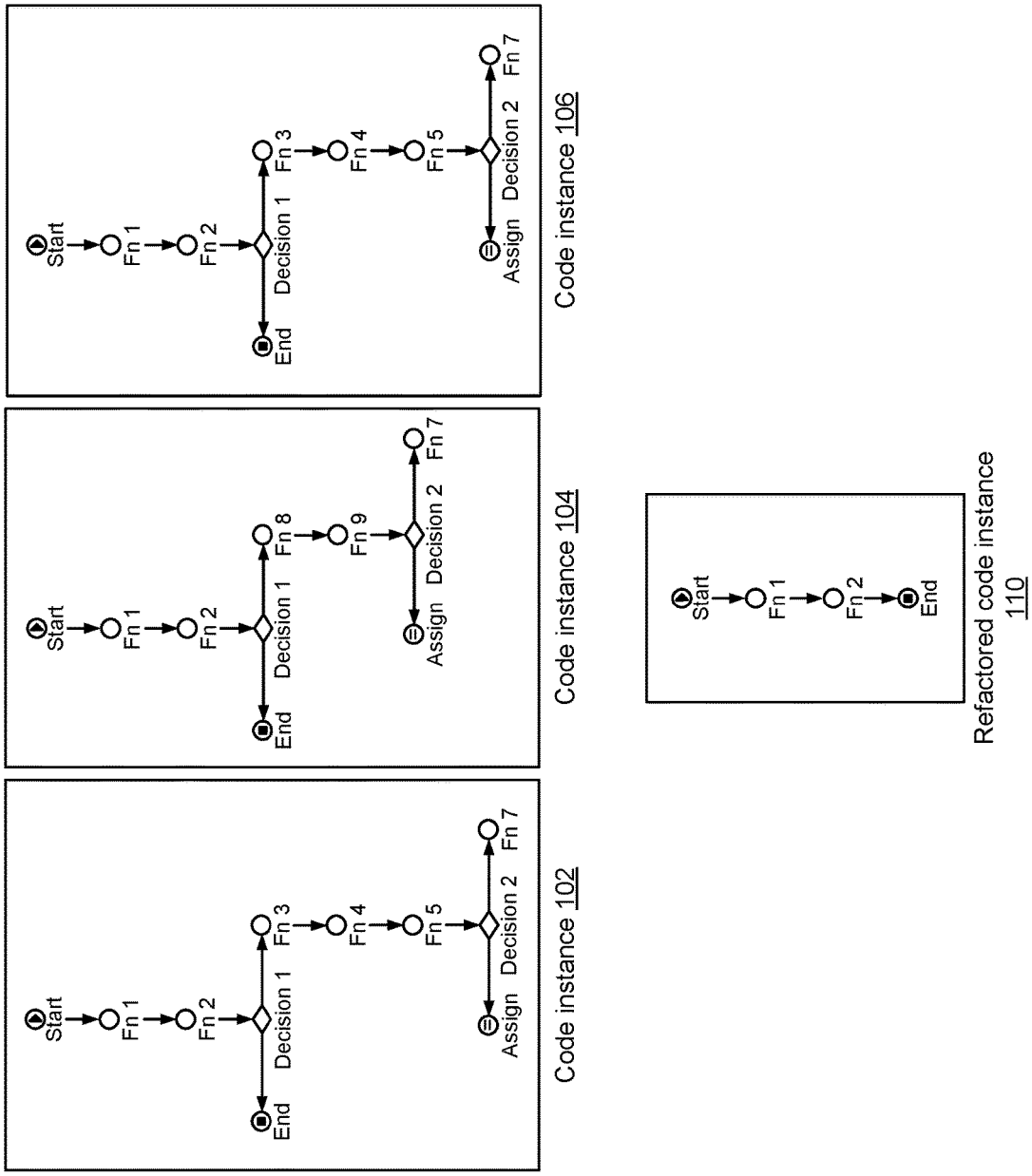
FIG. 1 shows an example of detected duplicated code patterns represented in a graphical user interface obtained in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Technical debt can be reduced by identifying duplicated code, and refactoring the duplicated code instances. Duplicated code refers to similar or identical code that has the same functionality. A factory refers to a group of code instances or programs/applications. Different teams within an organization may develop different programs and, collectively, the programs for the organization is called a "factory" or installation. An organization may have one or more factories, e.g., each department has its own factory. Refactoring refers to restructuring existing code while preserving its functionality, i.e., without changing the external behavior of the code. Refactoring duplicated code improves the design and structure of the code.

Techniques for detecting duplicated code patterns in visual programming language code instances are disclosed. In various embodiments, the techniques include a scalable duplicated code pattern mining process that leverages the visual structure of visual programming languages to detect duplicated code. The duplicated code may be highlighted (or more generally, visually distinguished from non-duplicated code) to explain the detected duplication. In a visual programming language, a computer program may be represented by a programmatic logic flow (sometimes also called "action flow" or simply "flow") made of nodes or steps. In various embodiments, the techniques identify instances of code duplication in a factory, find sub-patterns within flows, rank the patterns by refactoring value, and guide a user to find and refactor the duplicated code.

The disclosed techniques accurately and efficiently detect duplicated code instances by finding flows that have similar logic. The information can be aggregated and presented in any static analysis or code analysis tool such as an Integrated Development Environment (IDE) or Architecture Studio (or more generally an IDE such as Service Studio) by OutSystems® to help guide refactoring of those areas. For example, duplicated code instances can be ranked by importance to help guide teams in focusing or prioritizing refactoring of those areas.

Figure 2:
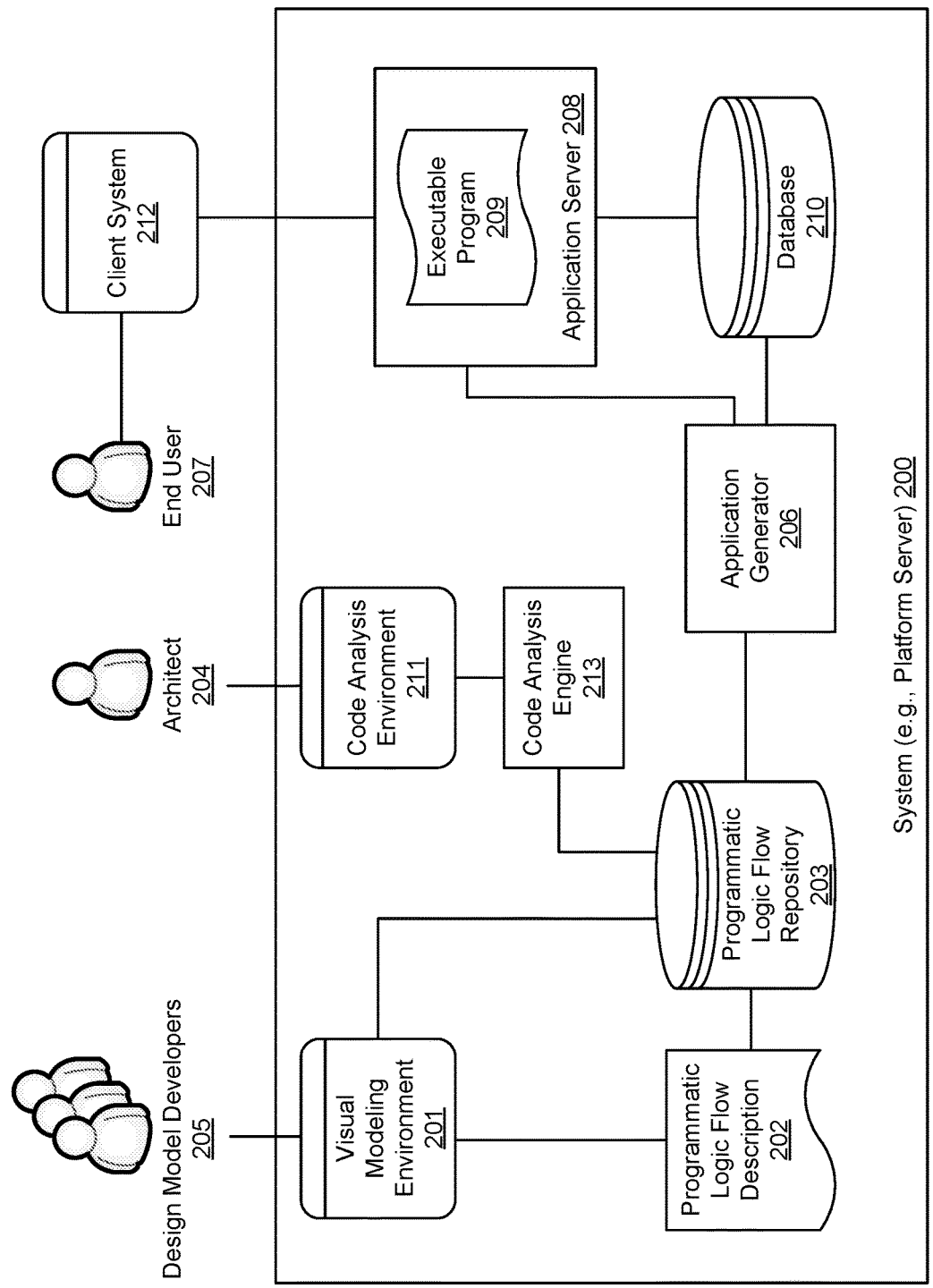
FIG. 2 is a block diagram illustrating an embodiment of a system for detecting duplicated code patterns in visual programming language code instances.
Figure 3:
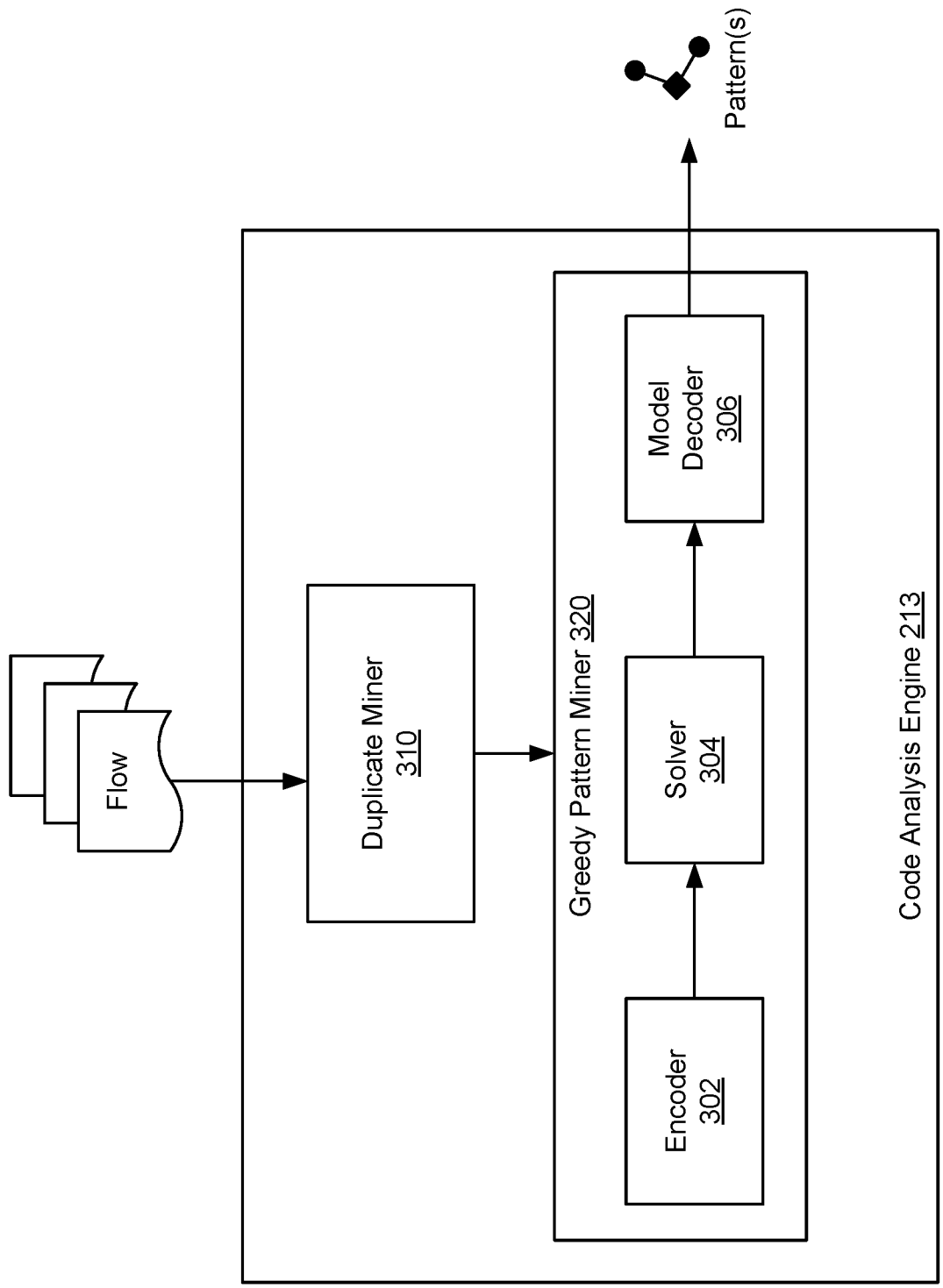
FIG. 3 is a block diagram illustrating an embodiment of a system for analyzing code.
Figure 4:
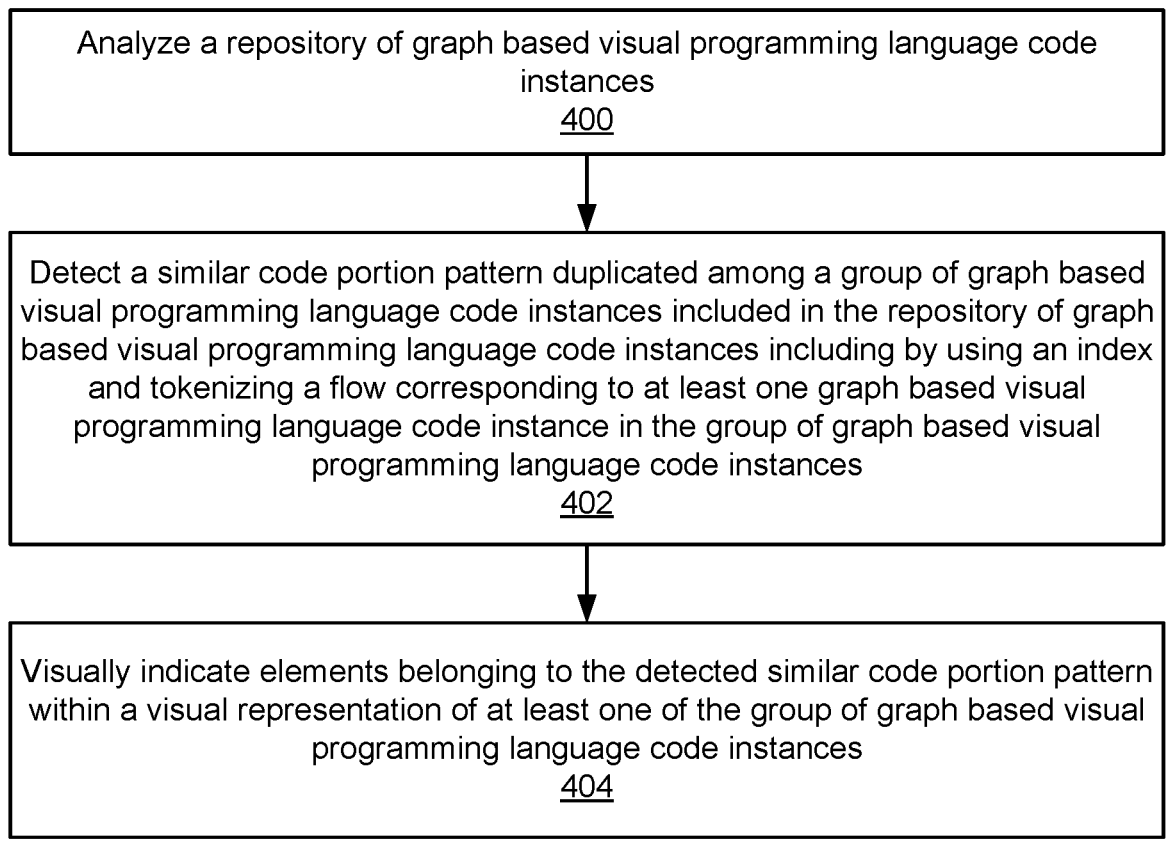
FIG. 4 is a flow diagram illustrating an embodiment of a process for detecting duplicated code pattern(s) in visual programming language code instances.
Figure 5:
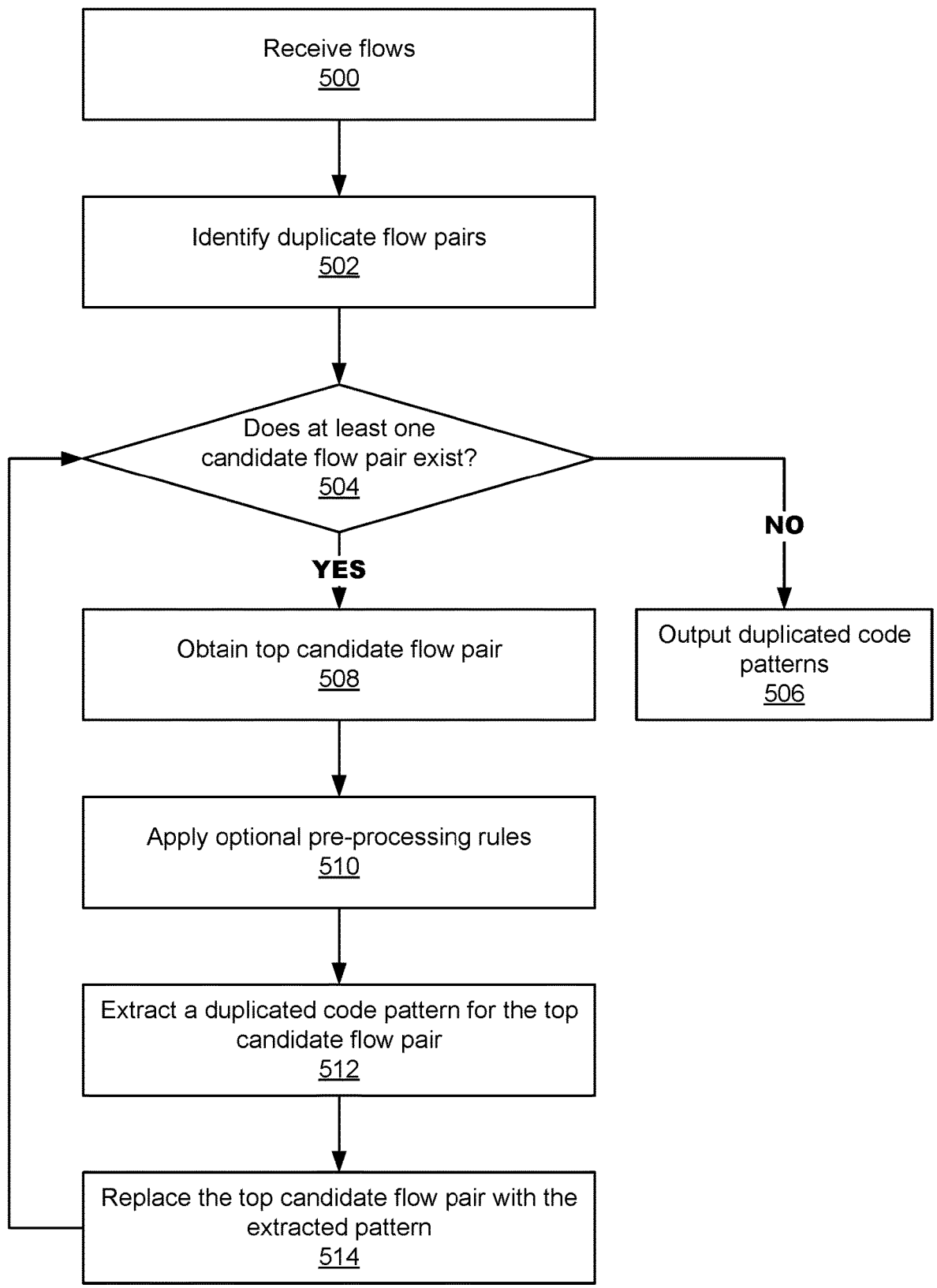
FIG. 5 is a flow diagram illustrating an embodiment of a greedy pattern mining process for detecting duplicated code patterns in visual programming language code instances.
Figure 6:
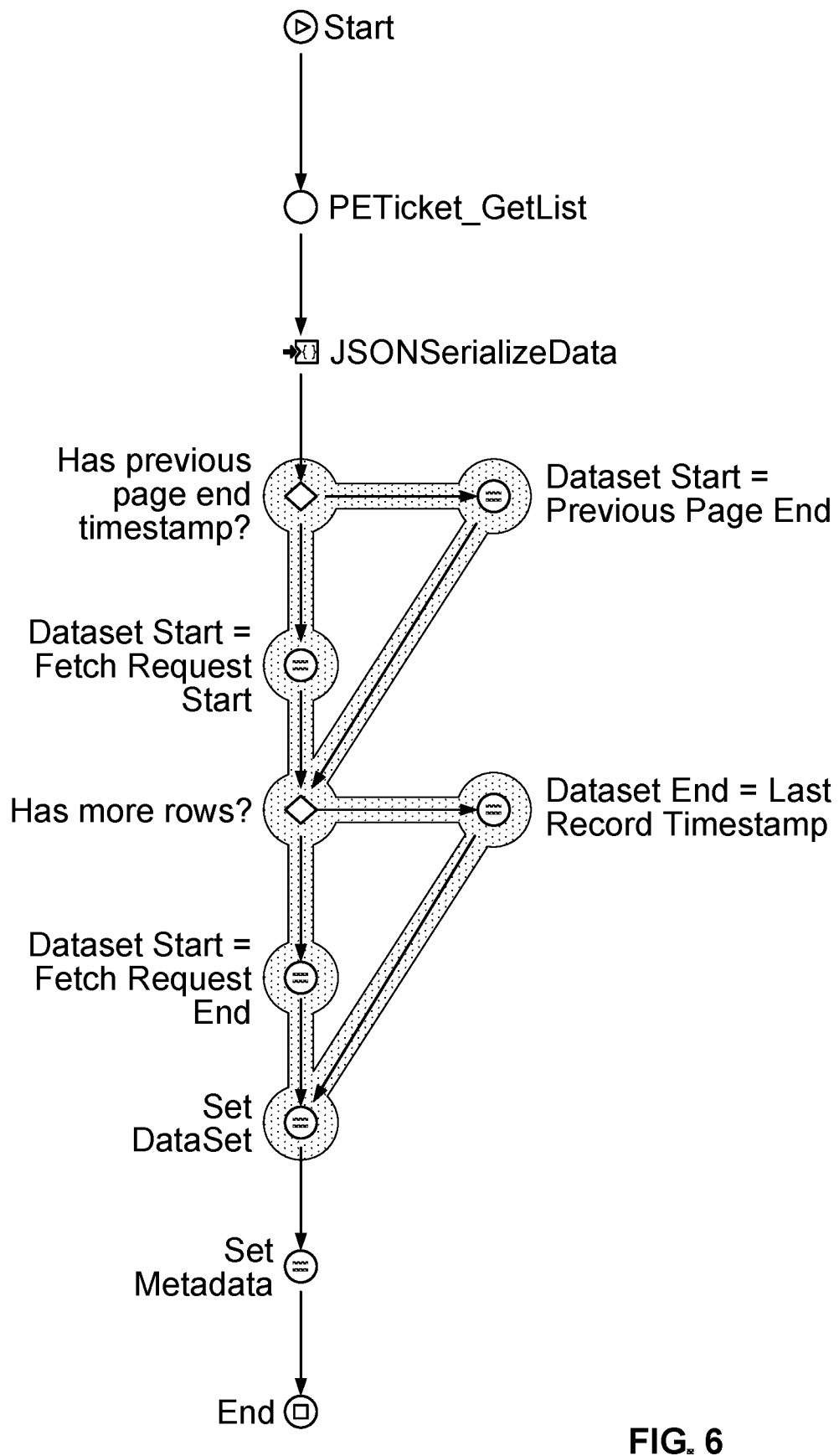
FIG. 6 shows an example of a programmatic logic flow in which a duplicated code portion is highlighted.
Figure 7:
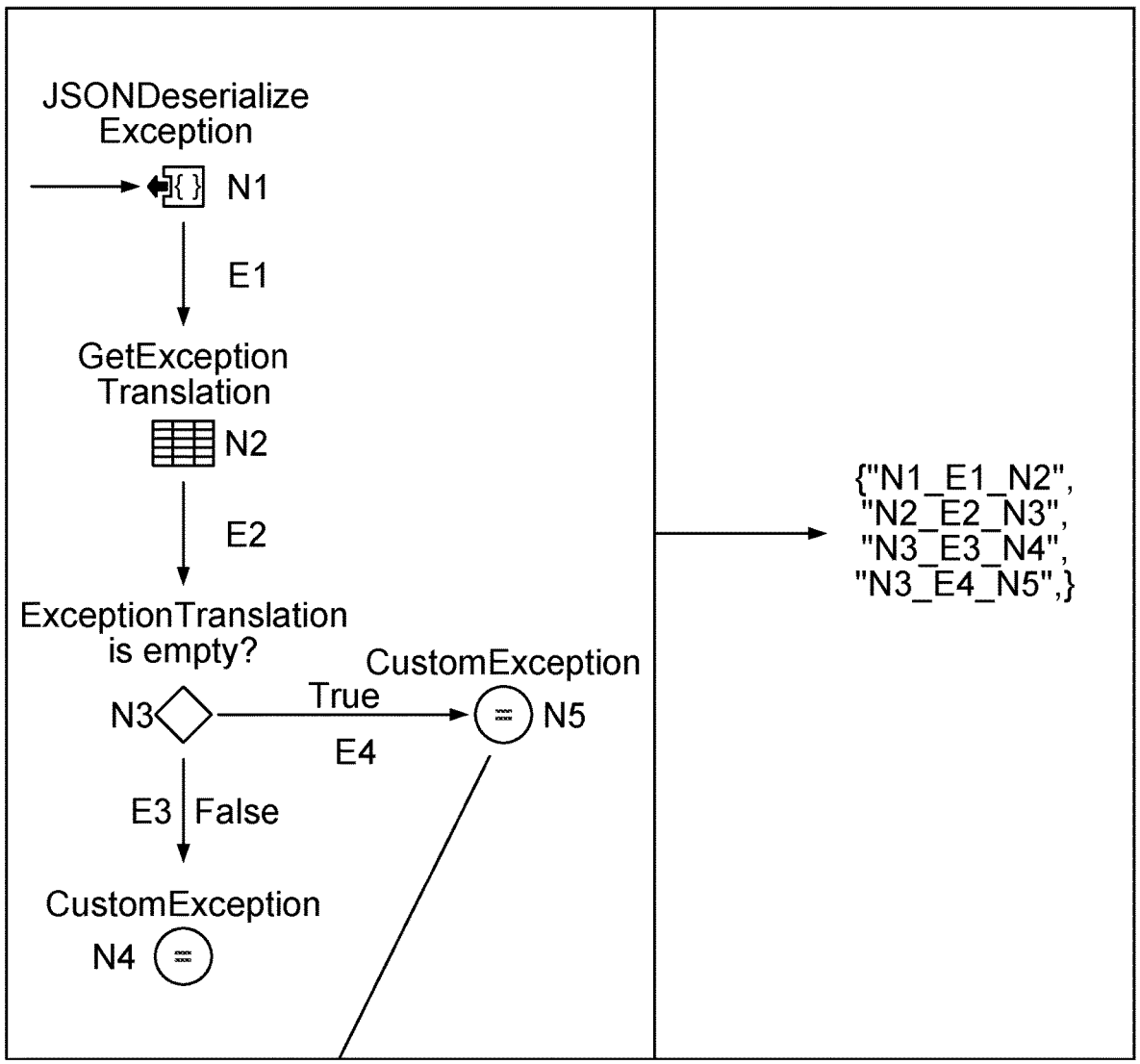
FIG. 7 shows an example of tokens used for an inverted index for a greedy pattern mining process.

First, an example of a duplicated code pattern is described (FIG. 1). Next, an example system for detecting duplicated code patterns is described (FIGS. 2 and 3). Then, an example process for detecting duplicated code patterns is described (FIGS. 4 and 5). Next, some example optimizations are described (FIG. 7). Finally, some example graphical user interfaces are shown (FIGS. 6 and 8-10).

FIG. 1 shows an example of detected duplicated code patterns represented in a graphical user interface obtained in some embodiments. The three code instances 102, 104, and 106 are examples of flows in visual programming languages. The disclosed techniques can be applied to the code instances to determine that they are duplicated code patterns. Code instances 102 and 106 are identical, while code instance 104 is similar to but not identical to the others. Upon identifying the duplicated code instances, the disclosed techniques can be applied to aid in refactoring the three code instances into a single function 110 containing the duplicated code (here, Start→Fn 1→Fn 2→End). Appearances of code instances 102, 104, and 106 in existing modules in a factory or programs developed in the future may be replaced by refactored code instance 110. These code instances are merely exemplary and not intended to be limiting. For example, the code duplication techniques may be used to identify sub-portions of flows, in which duplicated edges and/or nodes are highlighted within the flow as further described with respect to FIG. 6.

FIG. 2 is a block diagram illustrating an embodiment of a system for detecting duplicated code patterns in visual programming language code instances. The system 200 includes a visual modeling environment 201, a programmatic logic flow repository 203, an application generator 206, an application server 208, and database 210.

A design model developer 205, a user who is designated with the task of designing computer software design models, uses a modeling environment 201 (e.g., Service Studio by OutSystems®) to edit, generate and modify programmatic logic flows using a graphical user interface. The visual modeling environment 201 facilitates the visual construction and modification of the programmatic logic flows in a user friendly and intuitive way. For example, the visual modeling environment 201 may allow a user to visually select elements of a programmatic logic flow, and connect them as desired. The visual modeling environment 201 can be a software program running on a developer's 205 device, or can be software running on a server (e.g., accessed via a browser), or some combination. In one implementation, the visual modeling environment 201 is a combination of a software program running on a developer's computer and a set of software services running on a server being accessed by the modeling environment.

A programmatic logic flow description 202 describes, using abstractions, the intended behavior of a computer software system. Examples of functionality provided by such computer software systems include: login verification, notification, database storage, order processing, electronic wallet, calendar/scheduler, directories, news and information, and so on. Using the modeling environment 201, it is possible for a developer 205 to model distinct aspects of a computer software system, such as (a) the user navigation and user interface content to be presented to end-users; (b) the business rules that apply to the execution of the interactive events triggered by the end-user; (c) and the data transmission and data repository formats and relationships that support the execution of the application. These distinct aspects, in some implementations, can describe the intended behavior of the computer software system.

The design process of the programmatic logic flow can be assisted by the disclosed techniques. The code analysis engine 213 is configured to analyze code from programmatic logic flow repository 203. For example, probes may be set in various programmatic logic flows stored in repository 203. The code analysis engine analyzes (periodically or on demand) the code associated with the programmatic logic flows and outputs a set of patterns in flows in which they occur. An example of a pattern is an "if" statement followed by a loop. An example of a code analysis engine is CodeDNA by OutSystems®.

Figure 8:
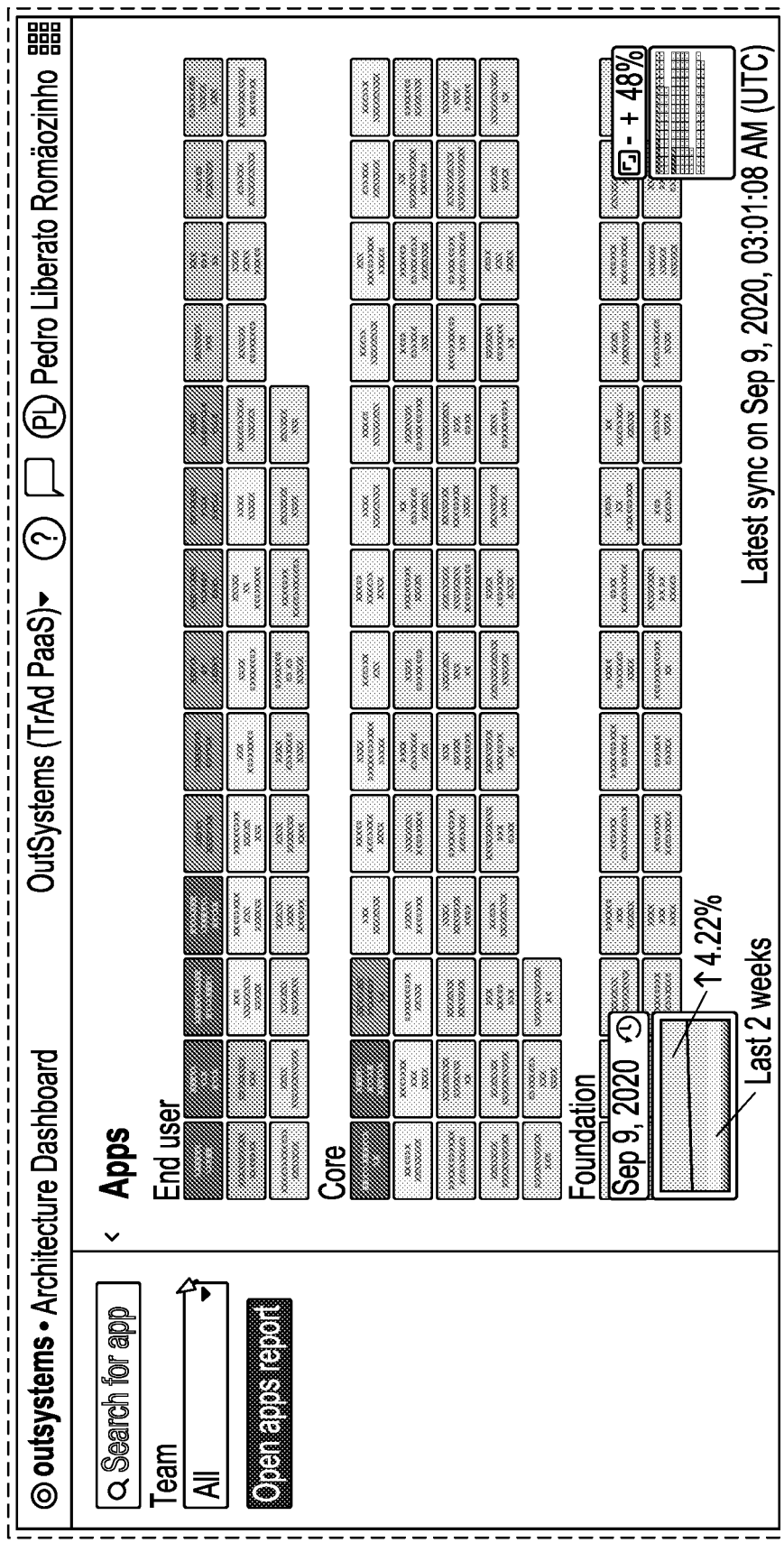
FIG. 8 is a diagram illustrating an example of an architecture dashboard obtained in some embodiments.

A user such as architect 204 or developer 205 can access the analysis performed by the code analysis engine via a code analysis environment 211. An example of a code analysis environment, namely an architecture dashboard, is shown in FIG. 8. Identified code patterns such as the example shown in FIG. 1 may be displayed within the code analysis environment.

Once a programmatic logic flow is designed, it is compiled into a programmatic logic flow description 202 to be submitted to a programmatic logic flow repository 203. The visual representations of the programmatic logic flows in the modeling environment 201 are translated into a structured representation used for processing by other components of the system 200. The modeling environment 201 is responsible for creating a programmatic logic flow description 202 document from visual representations. The programmatic logic flow description 202 can be generated at various times, for example when a developer 200 triggers the submission of a programmatic logic flow to the programmatic logic flow version repository 203 or in response to developer interaction with the programmatic logic flow such as adding, removing, or modifying a step in the programmatic logic flow.

In one embodiment, the programmatic logic flow description 202 document is structured using XML (Extensible Markup Language). XML is a language that can be used to describe information, or to make information self-describing, and which can facilitate mapping of visual models into a structured representation that can be parsed by other components of the system 200.

The version repository 203 stores the programmatic logic flow descriptions 202. By storing versions as development progresses, the repository retains information about how and when a programmatic logic flow changed over time. At any point in time, an authorized developer 205 can add a new version of a programmatic logic flow to the programmatic logic flow repository 203. Additionally, the version repository 203 is integrated with the visual modeling environment 201 to support collaboration among concurrent developers 205. In the simplest case, one single developer 205 adds revised versions of a programmatic logic flow to the programmatic logic flow repository 203. In more complex implementations, multiple developers 205 retrieve and add distinct versions of a programmatic logic flow to and from the programmatic logic flow repository 203. After completing a first version of a programmatic logic flow, the programmatic logic flow can continue to be developed, and, by learning with new developments, the model can self-evolve and optimize.

The programmatic logic flow repository 203 may be based on a database server such as Microsoft® SQL Server, Amazon® AWS Database, Oracle® Database and accessed via software services hosted in an application server system. These software services provide to the modeling environment 201 means to submit and retrieve programmatic logic flows as well as to submit and retrieve information about repository 203 content.

In the context of the system 200, an application generator 206 may be used to translate programmatic logic flows into an implementation of a computer software system. An implemented computer software system may include an executable program 209 to run in an application server 208 and a database definition to be hosted in a relational database system 210. The user navigation and user interface aspects, as well as the business rule and data transmission aspects of the model, are translated into the executable program 209. The executable program can be any executable or interpreted program, for example a web application targeting the .NET® platform from Microsoft®, Java/Jakarta Enterprise Edition (JEE) platform available from Oracle®, or various PHP-based platforms.

The data repository aspects of the computer software system are translated into a database 210. The database can be any sort of relational database. The generated executable program 209 may be automatically configured to access the database 210 according to the programmatic logic flow.

Once the executable program 209 and the database 210 are available on the system 200, respectively in the target application server system 208 and the relational database system 210, the application server system 208 can handle requests from end users 207, for example, using a Hyper Text Transfer Protocol (HTTP) client 212, a mobile client, a Web Browser, a backend system, etc. This means that the elements in the model that denote the way end users see and interact with the computer software system are generated as code, for example Web pages that are hosted in an application server system 208 and served via HTTP to a client 212. A request generates a response that is sent back to client system 212, which then may take the form of a graphical user interface to be displayed to end user 207. Some controls embedded in the graphical user interface may react to subsequent user generated events, and cause the browser to generate subsequent requests back to the application server system 208. For example, when a user presses a button visible in the client system 212, a form may be submitted to the application server system 208 that in response provides the content of a new interactive form to the client system 212.

The work product (e.g., modules) generated by the programmatic logic flow development process can be stored in a shared library of reusable modules. In various embodiments, anonymized data models and business logic patterns and/or models/patterns can be imported from third party systems.

Examples of anonymized data include:
Source code for cloud customers' software, which indicates how software is created
Requirements, user stories, support tickets, or the like, which specify what the user wants
Error logs, which can be analyzed to determine what went wrong with the developed software
Performance analytics data, which indicate factors that impact processing speed/latency what is fast/slow
End user satisfaction and feedback data, which indicates what works well and what does not work well
Integrated development environment (IDE) telemetry data, which indicates how developers create software
User interface mockups and final artifacts, which specify how a user wants an application or program to look FIG. 3 is a block diagram illustrating an embodiment of a system for analyzing code. The system is an example of code analysis engine 213 of FIG. 2. The system includes a duplicate miner 310 and a greedy pattern miner 320. The greedy pattern miner 320 includes an encoder 302, a solver 304, and a model decoder 306. The system is configured to identify patterns between flows. The identification can be reduced to a set of maximum satisfiability problems in which maximum common sub-graphs (MCSs) of graph representations of visual programming language code are iteratively mined to find patterns.

Duplicate miner 310 is configured to identify flows that are identical to each other. In various embodiments, the flows are processed by the duplicate miner 310 prior to being processed by the greedy pattern miner 320 so as to reduce the size of the set of flows that are examined for similarity. As further described herein, de-duplicating the initial set of graphs prior to running the mining process is an optimization that can increase processing speed.

Those flows that are duplicated are removed and the remaining set of flows is processed by greedy pattern miner 320. More specifically, encoder 302, sometimes referred to as maximum satisfiability or "MaxSAT" encoder, is configured to determine a maximum satisfiability formula. In various embodiments, the encoder receives a set of action flows, constructs a set of constraints and an objective function that encodes an MCS problem instance over the input flows, and outputs the respective maximum satisfiability formula.

Solver 304, sometimes referred to as maximum satisfiability or "MaxSAT" solver, is configured to output a model based on the maximum satisfiability formula determined by encoder 302. In various embodiments, the solver receives the formula, and outputs a model that corresponds to an assignment of variables that satisfies the constraints of the MaxSAT formula. Additionally, it optimizes the formula's objective function.

Model decoder 306 is configured to identify a pattern. The model decoder receives the model and outputs a pattern. The decoder converts the model to a solution of the maximum common sub-graph (MCS) problem encoded by the MaxSAT formula. A candidate flow pair is determined by applying a heuristic to identify the flow pair with the most likely largest amount of duplication. By replacing the top candidate flow pair with the extracted pattern, the pattern becomes a candidate that can be picked along with another flow (e.g., a flow pattern). The process can be repeated until one or more stopping criteria is met, e.g., no pair will be above a threshold. The result of the process is a tree of duplicated code patterns.

FIG. 4 is a flow diagram illustrating an embodiment of a process for detecting duplicated code pattern(s) in visual programming language code instances. This process may be implemented by system 213 in cooperation with other components of system 200.

In visual programming languages, business logic is implemented through flows. A flow is a directed weakly connected graph G=(V, E) where each node in V has one of the following types: Start, End, Instruction, Loop, If or Switch. Additionally, each edge in E can be of type Connector, True, False, Cycle, Condition or Otherwise. The outgoing edges of a node are referred to as branches. G satisfies the following properties:

G does not contain self-loops or parallel edges.

V contains only one Start node v, and no edge (u', v')∈E exists such that v=v'.

Given an End node v∈V, no branch exists in E for v and there exists at least one edge (u', v')∈E such that v=v'.

A Start or Instruction node u∈V has exactly one Connector branch (u, v)∈E.

An If node u∈V has exactly one True branch (u, v)∈E and one False branch (u, v')∈E.

A Loop node u∈V has exactly one Connector branch (u, v)∈E and one Cycle branch (u, v')∈E such that there exists a path from u to itself through (u, v').

A Switch node u∈V has at least one Condition branch (u, v)∈E and exactly one Otherwise branch (u, v')∈E.

The flow behaves like a control flow graph of a program written in a traditional programming language. Its execution begins at its Start node and terminates at one of its End nodes. Depending on their types, the nodes/edges can have different attributes. For example, an If (Loop) node contains a Boolean expression which dictates whether the execution is to continue through its True (Cycle) or False (Connector) branch. Similarly, a Condition branch of a Switch node contains a Boolean expression that, if evaluated to true, then the execution continues through that branch. Condition branches also have a pre-specified order of evaluation. If none of those branches evaluate to true, then execution resumes through the Otherwise branch. Instruction nodes can be of various kinds, such as variable assignments, database accesses, calls to other logic flows, among others. Just like functions/methods in text-based programming languages, logic flows can have input and output parameters.

The process identifies code patterns by solving a maximum satisfiability (MaxSAT) problem in which maximum common sub-graphs (MCSs) of graph representations of visual programming language code are iteratively mined to find patterns. Let $G_1=(V_1, E_1)$ and $G_2=(V_2, E_2)$ be a pair of graphs with labeled nodes/edges. Suppose that graphs are directed by default. (v) denotes the label of some node v. Given some label l, $V_i^l$ denotes the subset of nodes v∈Vi such that (v)=l. Analogously, (u, v) denotes the label of some edge (u, v) and $E_i^l$ denotes the subset of edges (u, v)∈$E_1$ such that L(u, v)=l. For convenience, $L_{comb}$ (u, v)=((u), L(u, v), L(v)) denotes the combined label of (u, v) and $E_i^{comb/l}$ denotes the subset of edges (u, v)∈$E_i$ such that $L_{comb}$ (u, v)=l. $L_{comb}$ ($E_i$) denotes the set of combined labels that occur in $E_i$.

A graph $G_C$=($V_C$, $E_C$) is a common sub-graph of $G_1$ and $G_2$ if there exist mappings $f_1$: $V_C$→$V_1$ and $f_2$:$V_C$→$V_2$ such that L(v)=L($f_1$(v))=L($f_2$(v)) for all v∈$V_C$ and L(u, v)=L($f_1$(u), $f_1$(v))=L($f_2$(u), $f_2$(v)) for all (u, v)∈$E_C$. $G_C$ is said to be an MCS if and only if no common sub-graph G=(V'c, E'c) of $G_1$ and $G_2$ exists containing more nodes or edges than $G_C$, i.e., such that |V'$_C$|>|$V_C$| or |E'$_C$|>|$E_C$|. For convenience, given a node v∈$V_i$, v∈$V_C$ denotes that there exists v'∈$V_C$ such that v' is mapped to v, i.e., $f_i$(v')=v. Analogously, given (u, v)∈E, (u, v)∈$E_C$ denotes that there exists (u', v')∈$E_C$ such that $f_i$(u')=u and $f_i$(v')=v.

Let X be a set of Boolean variables. A literal l is either a variable x∈X or its negation ¬x. A clause c is a disjunction of literals (l1∨l2 . . . ∨l). A propositional logic formula in Conjunctive Normal Form (CNF)ϕ is a conjunction of clauses c1∧c2∧ . . . ∧cn. A literal x (¬x) is said to be satisfied if and only if x is assigned the Boolean value 1 (0). A clause is satisfied if and only if at least one of its literals is satisfied. A CNF formula is satisfied if and only if all of its clauses are satisfied. Given a CNF formula ϕ, the Boolean Satisfiability (SAT) problem consists of deciding if there exists an assignment: X→{0, 1} of Boolean values to the variables of X that satisfies ϕ. If α exists, then α is said to be a model of ϕ. Otherwise, ϕ is said to be unsatisfiable.

MaxSAT is a generalization of SAT where, in addition to the CNF formula ϕ (referred to as the hard formula), there is a set S of soft clauses. The goal is to compute a model α of ϕ that minimizes the number of clauses in S not satisfied by α.

The process begins by analyzing a repository of graph based visual programming language code instances (400). In various embodiments, specific portions of the code are filtered so they are excluded from processing. For example, patterns built into the platform called scaffoldings are not analyzed for purposes of code de-duplication. Other examples include system flows (which always appear, and are a part of the underlying OutSystems' code) and OutSystems Forge flows (which are redistributable flows that different users can get from an open marketplace).

The process detects a similar code portion pattern among a group of graph based visual programming language code instances included in the repository of graph based visual programming language code instances including by using an index and tokenizing a flow corresponding to at least one graph based visual programming language code instance in the group of graph based visual programming language code instances (402). The similar code portion pattern can be a set of one or more code portions (e.g., at least a portion of a flow), for example stored as a set of pattern trees. A greedy pattern mining process can be applied to detect duplicated code patterns. In various embodiments, a single pattern is identified and a greedy pattern miner makes iterative calls to the pipeline to compute patterns that form a pattern tree. In other words, duplicated code patterns are mined from a given set of graphs $G_1$, $G_2$, . . . , $G_n$ by applying a greedy pattern mining process or a lazy version of the greedy pattern mining process, an example of which is shown in FIG. 5.

The process visually indicates elements belonging to the detected similar code portion pattern within a visual representation of at least one of the group of graph based visual programming language code instances (404). An example of a code instance identified to be duplicated is shown in FIG. 6.

FIG. 5 is a flow diagram illustrating an embodiment of a greedy pattern mining process for detecting duplicated code patterns in visual programming language code instances. This process may be implemented by system 213 in cooperation with other components of system 200.

This pattern mining process follows a greedy approach. The process iteratively picks the graph pair G, G' with the highest priority, according to some custom priority function, extracts a pattern GC of G and G' and replaces G and G' with GC. This process is repeated until there are no more graph pairs left to consider.

For the duplicated code use case, the priority function is based on the notion of refactor weight of a graph. Given some graph G=(V, E), each node v∈V has an associated refactor weight $ω_v$, which depends on its type and the kind of operations it performs. In various embodiments, a refactor weight of 1 is considered for all nodes except Instruction nodes that correspond to database accesses. The weight of such nodes is given by the respective number of database entities, and filter and sort statements. Similarly, a refactor weight of $\omega_{u,v}=1$ is considered for all edges $(u, v) \in E$. Let $G_{w1}=(V_{w1}, E_{w1})$, $G_{w2}=(V_{w2}, E_{w2})$, ..., $Gw_p=(Vw_p, Ew_p)$ denote the p weakly connected components of G. A weakly connected component $Gw_i$ is a maximal sub-graph of G such that, for all node pairs u, $v \in Vw_i$, v is reachable from u in the undirected counterpart of G. The refactor weight $\omega_G$ of G is given by:

$$\omega_G = \max_{i \in \{1,2,\ldots,p\}} \left\{ \sum_{v \in V_{Wi}} \omega_v + \sum_{(u,v) \in E_{Wi}} \omega_{u,v} \right\} \quad (1)$$

The maximum weight across G's components is considered instead of the sum because, from a duplicated code refactoring perspective, patterns with less but bigger components are preferable. Given a graph pair G, G', its priority is an upper bound of the refactor weight of an MCS of G and G'. Given two weakly connected components $Gw_i$ and $G' w_j$ of G and G' respectively, the upper bound comp_ub ($Gw_i$, G' $w_j$) for those components is given by:

$$\min_{E_W \in \{E_{W_i}^{comb/\ell}, E_{W_j}^{'comb/\ell}\}} \left\{ \sum_{(u,v) \in E_W} (\omega_{u,v} + \omega_u + \omega_v) \right\} \quad (2)$$

Assuming G' has q components, the refactor weight upper bound ub(G, G') for G and G' is given by:

$$ub(G, G') = \max_{i,j \in \{1,2,\ldots,p\} \times \{1,2,\ldots,q\}} \{\text{comp\_ub}(G_{Wi}, G'_{Wj})\} \quad (3)$$

The process begins by receiving flows (500). For example, the process receives as input a set of n graphs $G_1$, $G_2$, ..., $G_n$ and a minimum refactor weight threshold $\beta$, and returns a set R of maximal patterns with a refactor weight of at least $\beta$. The process initializes a set A of active graphs, discarding graphs with a refactor weight lower than $\beta$. Then, the process initializes a priority queue Q with all possible pairs of graphs in A.

The process identifies duplicate flows (502). Identifying and deduplicating flows (also called isomorphic pattern mining) is an optional optimization that may be performed (e.g., by duplicate miner 310) before running the mining process to increase processing speed. For example, prior to applying the greedy pattern miner, a duplicate miner deduplicates flows that are exact replicas of each other. Depending on the factory, this can greatly reduce the set of patterns that get processed by the greedy pattern miner. For example, in some sample sets, almost 20% of flows can be removed this way. Given two graphs $G_1=(V_1, E_1)$ and $G_2=(V_2, E_2)$ and an MCS $G_C=(V_C, E_C)$ of $G_1$ and $G_2$, $G_1$ and $G_2$ are considered isomorphic if and only if, for all $v \in V_1 \cup V_2$, $v \in V_C$, and for all $(u, v) \in E_1 \cup E_2$, $(u, v) \in E_C$. When this is the case, $G_C$ is referred to as an isomorphic duplicated code pattern. The MaxSAT encoding described herein can be adapted to extract only isomorphic patterns by adding the following clauses:

Unit clauses containing each of the inclusion and control-flow variables. Examples of inclusion and control-flow variables are further described herein.

A clause ($\vee_{u \in V_1} f_{u,u'}$) for each node $v' \in V_2$.

A clause ($\neg f_{u,v'}, \vee \neg f_{u,v'}$) for each edge $(u', v') \in E_2$ and nodes u, $v \in V_1$ such that $(u, v) \notin E_1$ or $L(u, v) \neq L(u', v')$.

By doing so, the single pattern extraction problem becomes a decision problem, which can be solved much more efficiently than its optimization version. In many practical scenarios, one can quickly conclude that $G_1$ and $G_2$ are not isomorphic by checking if $|V_1| \neq |V_2|$ or $|E_1| \neq |E_2|$, or if any of the pre-processing rules described herein is applicable.

An isomorphic pattern mining process can be performed as follows. The process maintains a dictionary D of lists of graphs where the isomorphic patterns are stored. Initially, D is empty. For each graph $G_i$, the process starts by computing the key for $G_i$, which is the sorted concatenation of the combined labels of the edges in $E_i$. Next, the process checks if there exists a graph G in D, among those with the same key as $G_i$, such that G and $G_i$ are isomorphic. Note that G and $G_i$ will have the same key if and only if each combined label appears the exact same number of times in both graphs, which is a necessary condition in order for G and $G_i$ to be isomorphic. If such G exists, then an isomorphic pattern $G_C$ is extracted for G and $G_i$, and G's entry in D is replaced with $G_C$. Otherwise, $G_i$ is added to D. Finally, the isomorphic patterns in D are returned by the process.

The process determines whether at least one candidate flow pair exists (504). A candidate flow pair is one that has a refactor weight upper bound of at least $\beta$. For example, the process evaluates all possible pairs of graphs in A. If no candidate flow pairs exist, the process outputs duplicated code patterns (506) for example as pattern trees. Otherwise, the process obtains a top candidate flow pair (508) and then optionally applies one or more pre-processing rules (510) as further described herein. The top candidate flow pair is the one that is most likely to contain the largest duplicated sub-portion.

The process extracts a duplicated code pattern for the top candidate flow pair (512). While Q is not empty, the process repeatedly pops a pair G and G' from the queue, and, if the upper bound for G and G' satisfies the threshold $\beta$ and both graphs are still active, the process extracts a pattern GC of G and G' using the single pattern extraction techniques described herein.

A single maximal duplicated code pattern can be extracted from a pair of logic flows $G_1=(V_1, E_1)$ and $G_2=(V_2, E_2)$. Essentially, the maximal pattern is an MCS of $G_1$ and $G_2$. An MCS can be extracted by mapping the nodes of $G_2$ into the nodes of $G_1$. Some mappings are not valid, such as mapping an If node to an Instruction. In order to specify such constraints, node and edge labels are used.

The following three sets of Boolean variables are considered:

Inclusion variables. For each node $v \in V_1$, a variable $o_v$ is introduced to encode if v is part of the pattern (i.e. $o_v=1$) or not (i.e. $o_v=0$).

Mapping variables. For each node pair v, v' such that $v \in V_1$ and $v' \in V_2$, a variable $f_{v,v'}$ is introduced to encode if v' is mapped to v (i.e. $f_{v,v'}=1$) or not (i.e. $f_{v,v'}=0$).

Control-flow variables. For each edge $(u, v) \in E_1$, a variable $c_{u,v}$ is introduced to encode if $(u, v)$ is part of the pattern (i.e. $c_{u,v}=1$) or not (i.e. $c_{u,v}=0$).

The hard formula contains the following clauses:

Inclusion clauses. A node $v \in V_1$ is in the pattern if and only if at least one node in $V_2$ is mapped to v:

$$\bigwedge_{v \in V_1} \left[ \left( \neg o_v \vee \bigvee_{v' \in V_2} f_{v,v'} \right) \wedge \bigwedge_{v' \in V_2} (o_v \vee \neg f_{v,v'}) \right] \quad (4)$$

One-to-one clauses. At most one node in $V_2$ can be mapped to each node $v \in V_1$:

$$\bigwedge_{v \in V_1} \bigwedge_{u' \in V_2} \bigwedge_{v' \in V_2, u' \neq v'} \left( \neg f_{v,u'} \vee \neg f_{v,v'} \right) \quad (5)$$

Function property clauses. Each node $v' \in V_2$ cannot be mapped to more than one node in $V_1$:

$$\bigwedge_{v' \in V_2} \bigwedge_{u \in V_1} \bigwedge_{v \in V_1, u \neq v} \left( \neg f_{u,v'} \vee \neg f_{v,v'} \right) \quad (6)$$

Label consistency clauses. A node $v' \in V_2$ cannot be mapped to $v \in V_1$ if $v$ and $v'$ do not share the same label:

$$\bigwedge_{v \in V_1} \bigwedge_{v' \in V_2 \setminus V_2^{L(v)}} \left( \neg f_{v,v'} \right) \quad (7)$$

Control-flow consistency clauses. Consider some edge $(u, v) \in E_1$ and a pair of nodes $u'$, $v' \in V_2$. If $u'$ and $v'$ are mapped to $u$ and $v$ respectively, and $(u', v')$ is not an edge of $G_2$ or does not share the same label as $(u, v)$, then $(u, v)$ cannot be in the pattern:

$$\bigwedge_{(u,v) \in E_1} \bigwedge_{(u',v') \in (V_2 \times V_2) \setminus E_2^{L(u,v)}, u' \neq v'} \left( \neg f_{u,u'} \vee \neg f_{v,v'} \vee \neg c_{u,v} \right) \quad (8)$$

No spurious edge clauses. An edge $(u, v) \in E_1$ can be part of the pattern only if both $u$ and $v$ are as well:

$$\bigwedge_{(u,v) \in E_1} \left( \neg c_{u,v} \vee d_u \right) \wedge \left( \neg c_{u,v} \vee d_v \right) \quad (9)$$

No isolate node clauses. A node $v \in V_1$ can be part of the pattern only if at least one of its incoming/outgoing edges is in the pattern:

$$\bigwedge_{v \in V_1} \left( \neg d_v \vee \bigvee_{(p,q) \in E_1, v=p \vee v=q} c_{p,q} \right) \quad (10)$$

The definition of MCS does not forbid the inclusion of isolate nodes. However, in this hard formula embodiment, the inclusion of isolate nodes is forbidden because such nodes are not desirable for the duplicated code pattern mining use case.

In various embodiments, the optimization goal is to maximize the number of edges in the pattern, which is given by the following set of soft clauses:

$$\bigcup_{(u,v) \in E_1} \{(c_{u,v})\} \quad (11)$$

Although the encoding described here focuses on extracting an MCS of a pair of graphs, it can be easily extended to k graphs by considering k−2 extra sets of mapping variables and adding the corresponding inclusion, one-to-one, function property, label consistency and control-flow consistency clauses to the hard formula.

The process replaces the top candidate flow pair with the extracted pattern (514). If the refactor weight of GC satisfies the threshold β, then G and G' are removed from the active set A, GC is stored in R, new pairs with GC and the remaining active graphs are added to Q, and GC is added to the active graph set.

In various embodiments, one or more preprocessing rules is applied prior to 510 to reduce the size of $G_1$ and $G_2$ and simplify the resulting MaxSAT formula. A few examples will now be described. A first rule discards edges with combined labels that do not occur in both $E_1$ and $E_2$. Given a pair of graphs $G_1=(V_1, E_1)$ and $G_2=(V_2, E_2)$, and an edge $(u, v) \in E_1$ such that $L_{comb}(u, v) \notin L_{comb}(E_2)$, then an MCS of $G_1$ and $G_2$ is also an MCS of $G_1'$ and $G_2$, where $V_1'=V_1$ and $E_1'=E_1 \setminus \{(u, v)\}$, and vice-versa. This may cause either $G_1$ or $G_2$ to become disconnected.

More specifically, some edges may become "orphan edges," i.e., an edge $(u, v) \in E_i$ such that $u$ and $v$ do not appear in any edges of $E_i$ other than $(u, v)$. In other words, no other edge $(p, q) \in E_i$ exists such that $p \in \{u, v\}$ or $q \in \{u, v\}$. Let $O_i^{comb/l}$ denote the subset of orphan edges in $E_i^{comb/l}$. If $|O_1^{comb/L(u,v)}| > |E_2^{comb/L(u,v)}|$, then $G_1$ is said to contain an excess of orphan edges with combined label $L_{comb}(u, v)$. A second rule discards orphan edges responsible for excesses in $G_1$ and $G_2$ until this is no longer the case. Given a pair of graphs $G_1=(V_1, E_1)$ and $G_2=(V_2, E_2)$, and an orphan edge $(u, v) \in E_1$, if $G_1$ contains an excess of orphan edges with combined label $L_{comb}(u, v)$, then there exists an MCS $G_C=(V_C, E_C)$ of $G_1$ and $G_2$ such that $(u, v) \notin E_C$.

The aforementioned rules may also cause some of the components of some Gi to become simple paths, i.e. a subgraph of $G_i$ with node set $V_S=\{v_1, v_2, \ldots, v_n\}$ such that $(v_j, v_{j+1}) \in E_i$, for all $1 \leq j < n$, and no other edge exists in $E_i$ with nodes from $V_S$. Assuming i=1, let $P_1^{(Lcomb(v_1, v_2), \ldots, Lcomb(v_{n-1}, v_n))}$ denote the set of all simple path components $V'_S=\{v'_1, v'_2, \ldots, v'_n\}$ in $G_1$ such that $Lcom(v_j, v_{j+1})=L_{comb}(v'_j, v'_{j+1})$ for all $1 \leq j < n$.

A third rule discards $v_1$ ($v_n$) if there exist more components in $P_1^{(Lcomb(v_1,v_2), \ldots, Lcomb(v_{n-1},v_n))} | > |V_2^{L(v_1)}|)$, than nodes in $V_2^{L(v_1)}$ ($V_2^{L(v_n)}$). Given a pair of graphs $G_1=(V_1, E_1)$ and $G_2=(V_2, E_2)$ such that $G_1$ contains a simple path component $V_S=\{v_1, v_2, \ldots, v_n\}$, if $|P_1^{(Lcomb(v_1,v_2), \ldots, Lcomb(v_{n-1},v_n))}| > |v_2^{L(v_1)}|)$, then there exists an MCS $GC=(V_C, E_C)$ of $G_1$ and $G_2$ such that $v_1 \notin V_C$.

The three rules (and possibly others) may be repeatedly used to simplify $G_1$ and $G_2$ until these are no longer applicable. At each iteration, isolate nodes are also discarded since the described MaxSAT encoding forbids the inclusion of such nodes in the MCS.

In various embodiments, the process allows custom post-processing of the patterns after their extraction. This is supported for several reasons. First, it may be the case that GC contains some If or Switch node v with none of its branches in the pattern, i.e. no $(u', v') \in E_C$ exists such that $u'=v$. Such nodes cannot be refactored to a separate logic flow, thus they are discarded and the respective edges in post-processing. Second, even though the refactoring weight of GC may satisfy the threshold β, it may be the case that some of its weakly connected components do not. Such components are discarded as well during post-processing.

Additionally, due to the greedy nature of the process, it can easily be extended in order to obtain a tree hierarchy of the patterns. Let G and G' be two duplicated code patterns, extracted by the algorithm, that occur across the logic flows in sets F and F' respectively. Assuming that, at some point during its execution, the algorithm extracts an MCS GC for G and G', then GC is a possibly smaller pattern that occurs across the flows in F∪F'. The tree hierarchy would contain an internal node for GC with two children nodes for G and G'. Analogously, children of G would represent possibly larger patterns that occur in subsets of F. In various embodiments, this tree hierarchy can be used to provide a guided refactoring experience to the user. Such an experience would be based on the fact that it may be the case that a duplicated code pattern contains a smaller sub-pattern that occurs in more flows, besides those that contain the larger pattern. As such, when refactoring duplicated code, one can take advantage of this by suggesting the smaller sub-pattern as the first target for refactorization, with each following outer pattern making use of the refactored inner patterns. The aforementioned tree hierarchy has this layered structure encoded within it, making it so that the experience can be directly derived from it.

A lazy version of the greedy pattern mining process may be performed to decrease processing time. For example, the miner collects all pairs of a single flow (e.g., assumes the rank of a flow pair is X). If X is the highest rank among the collected flow pairs, then the pattern is extracted for the flow pair because patterns are monotonically decreasing. If the largest priority in the queue remains the same, then a pattern can be safely extracted for the pair with the highest priority before considering any more candidate pairs. This optimization can reduce the time it takes to find a first duplicated pattern.

The lazy process is based on the observation that, given two graphs $G_i$ and $G_j$, $1 \leq i,j \leq n$, such that $i \neq j$, and $ub(G_i, G_j) \geq ub(G_i, G_k)$ and $ub(G_i, G_j) \geq ub(G_j, G_k)$ for all $1 \leq k \leq n$, then a pattern for $G_i$ and $G_j$ can be safely extracted before performing any further upper bound computations. This property comes as a consequence of the monotonicity of Equation (12).

$$ub(G, G') = \max_{i,j \in \{1,2,\ldots,p\} \times \{1,2,\ldots,q\}} \{comp\_ub(G_{Wi}, G'_{Wj})\} \quad (12)$$

Given three graphs $G_1=E_1$), $G_2=(V_2, E_2)$ and $G_3=(V_3, E_3)$, and an MCS $GC=(V_C, E_C)$ of $G_1$ and $G_2$, then $u(G_1, G_3) \geq ub(G_C, G_3)$ and $ub(G_2, G_3) \geq ub(G_C, G_3)$.

The lazy greedy pattern mining process has many similarities with the non-lazy version, with the main difference being the management of the priority queue Q and active graph set A. Initially, Q and A are empty and a set of inactive graphs I is initialized with all graphs with a refactor weight that satisfies the threshold β. At each iteration, the process starts by checking if Q is empty. If so, then a graph G∈I is activated. This corresponds to moving G from I to A and adding new pairs to Q containing G and each remaining inactive graph. Next, if necessary, additional graphs are activated until the pair in Q with the highest upper bound no longer contains inactive graphs. The rest of the process behaves in the same way as the non-lazy version, with the exception that the extracted pattern GC is added to the inactive set I instead of A. This process is repeated until Q becomes empty and at most 1 inactive graph is left.

FIG. 6 shows an example of a programmatic logic flow in which a duplicated code portion is highlighted. The duplicated code portion can be determined using the disclosed techniques and visually distinguished from the remainder of the programmatic logic flow. This helps a user to quickly and easily identify the portion that is duplicated. This example can be displayed in a graphical user interface or tool as further described with respect to FIGS. 8-10.

FIG. 7 shows an example of tokens used for an inverted index for a greedy pattern mining process. In various embodiments, an inverted index can be used in order to further reduce the runtime of a greedy pattern mining process such as the one shown in FIG. 5. Although an inverted index is described in this example, this is not intended to be limiting as other types of indexes may be used that function similarly to reduce the runtime of the greedy pattern mining process. More specifically, an inverted index can be used at 504 to reduce the size of the set of pairs to review, which decreases the time it takes to identify similar code portions. The most frequent tokens are used to build an inverted index of code snippets. Tokenizing can be adapted to non-text based code snippets such as graph-based flows by combining node and edge labels. The label for each node defines the equality between nodes and edges. The combined edge label is the concatenation of the node label of a first node, the edge label of the edge, and the node label of a second node combining the two nodes. The concatenation can be used as a token.

In order to further reduce the amount of refactor weight upper bound computations, a partial inverted index can be used. In various embodiments, the inverted index is a mapping of combined edge labels to lists of graphs that those labels appear in. The index is deemed partial because it may contain entries only for a subset of combined labels that occur with the most frequency.

An index for a given set of graphs $G_1, G_2, \ldots, G_n$ may be created as follows. For each graph $G_i$, it starts by creating a bag B of the combined labels that appear in $G_i$, sorted in decreasing order of their global frequency. The global frequency of some combined label $l \in L_{comb}$ ($E_1$) is given by:

$$\frac{\sum_{j=1}^{n} |E_j^{comb/\ell}|}{\sum_{j=1}^{n} |E_j|} \quad (13)$$

Lastly, entries containing $G_i$ are added to the inverted index I for a prefix of B. The prefix size is controlled through the S input parameter, which represents the fraction of a graph's combined labels to include in the index. For example, if δ=0.2, then the 20% most frequent combined labels in B are included in I.

The greedy pattern mining process (lazy and non-lazy version) described herein can be adapted in order to integrate the inverted index. First, during queue initialization, only pairs of graphs that occur in the same index list are considered. Second, a new pattern GC is added to the before updating the queue, and the respective new queue pairs should contain only graphs that occur in the same index lists as GC.

FIG. 8 is a diagram illustrating an example of an architecture dashboard obtained in some embodiments. Although the architecture dashboard is shown as an example, this is not intended to be limiting as the disclosed techniques find application in various code analysis tools such as Service Studio or CodeDNA in Architecture Dashboard by OutSystems®. The Architecture Dashboard performs code and runtime analysis to recommend solutions for improving performance, security, architecture, and user experience of applications. The code can be created in a variety of ways including via a "low code" or "no-code" software development tool such as ServiceStudio OutSystems® in which developers design computer programs by interacting with a graphical user interface to visually model program functionality.

A tool such as an architecture dashboard can analyze the code and runtime performance of the work product of many developers. The architecture dashboard can help visualize cross-portfolio architectures and interdependencies between modules and provide guidance for best practices and common pitfalls thereby visualizing and managing technical debt. For example, this enables departmental applications to become adopted as organization-wide solutions without needing to rewrite code.

This architecture dashboard shows modules within a factory. The level of technical debt in each module may be indicated by a visual marker such as the background color of the module. For example, red modules have the most technical debt, orange modules have medium technical debt, and green modules have the least technical debt. Users can drill down into the modules, for example performing the disclosed code duplication identification and refactoring techniques to reduce the technical debt. Upon clicking on a module, a graphical user interface such as the one shown in the following figure is displayed.

FIG. 9 is a diagram illustrating an example of an architecture dashboard obtained in some embodiments. This graphical user interface shows an example report for a module. Upon clicking "Duplicated Code," a list of patterns and the number of duplicate instances is displayed. The list is ranked according to the potential for refactoring, where it would be more beneficial to refactor the higher ranked patterns before refactoring the lower ranked patterns. In other words, the ranking reflects the technical debt of the pattern because higher ranked patterns cause more technical debt than lower ranked patterns. The higher ranked patterns would reduce the code base more if refactored.

Some factors in determining pattern ranking include: type of node (complexity of node such as aggregates), number of duplicates, length/size of duplicated section. The ranking is customizable, so factors considered for ranking can be set based on preferences. This information can be conveyed in other user interfaces or places. For example, in a visual modeling environment the information can be displayed in a context menu or as a warning.

Figure 10:
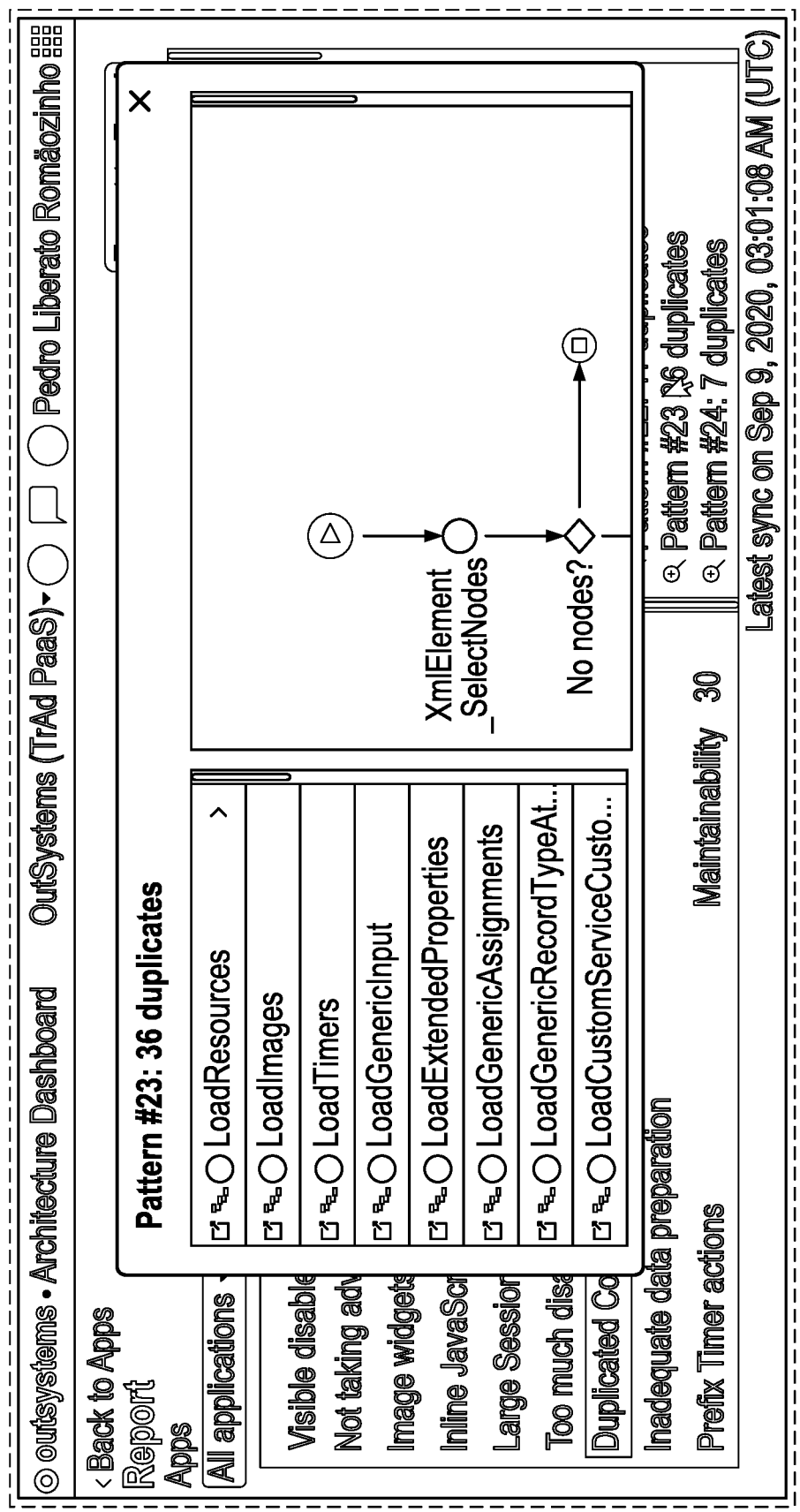
FIG. 10 is a diagram illustrating an example of an architecture dashboard obtained in some embodiments.

FIG. 10 is a diagram illustrating an example of an architecture dashboard obtained in some embodiments. This graphical user interface shows an example pattern identified using the disclosed techniques. When a pattern is selected, a preview is displayed in the right-hand panel. The panel shows the portion of the logic where the pattern appears. The pattern is linked to a visual modeling environment so a user can be re-directed to the visual modeling environment to modify the flow. For example, the user can use the "extract to action" functionality (which automatically creates a function from the selected portion of code) to refactor the code pattern into a function.

Conventional code duplication detection takes several files or functions and identifies duplicates. Typically, conventional techniques are able to compare entire functions (and not snippets within a function) and would consider them to be duplicates only if they are very similar. Also, typically no explanation for considering them to be duplicates is provided. By contrast, the disclosed techniques can identify duplicates within dissimilar flows and identifies the portion of the code that is considered to be duplicated, e.g., highlighting the duplicated portion as shown in FIG. 6. In another aspect, conventional graph-based code similarity detection is typically not scalable and does not show snippets within code that are similar. Unlike conventional techniques that typically are not scalable because it is computationally expensive to check sub-graph isomorphism, the disclosed techniques are scalable. In one aspect, the disclosed graph-based techniques are scalable because an inverted index enables graph similarities to be efficiently identified for many sets of graphs or sub-graphs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
analyzing a repository of graph based visual programming language code instances;
detecting a similar code portion pattern duplicated among a group of graph based visual programming language code instances included in the repository of graph based visual programming language code instances including by:
using an index and tokenizing a flow corresponding to at least one graph based visual programming language code instance in the group of graph based visual programming language code instances;
determining that at least one candidate flow pair exists;
in response to determining that the at least one candidate flow pair exists, obtaining an identified candidate flow pair;
extracting a duplicated code pattern for the identified candidate flow pair; and
replacing the identified candidate flow pair with the extracted duplicated code pattern; and
within a visual representation of at least one of the group of graph based visual programming language code instances, visually indicating elements belonging to the detected similar code portion pattern.

2. The method of claim 1, wherein replacing the identified candidate flow pair with the extracted duplicated code pattern is based at least in part on a refactor weight associated with the extracted duplicated code pattern meeting a threshold.

3. The method of claim 1, wherein determining that the at least one candidate flow pair exists includes evaluating a set of candidate flow pairs in which a previous identified candidate flow pair is replaced with the extracted duplicated code pattern.

4. The method of claim 1, wherein detecting the similar code portion pattern duplicated among the group of graph based visual programming language code instances includes:
in response to determining that the at least one candidate flow pair does not exist, outputting duplicated code patterns.

5. The method of claim 1, wherein extracting the duplicated code pattern for the identified candidate flow pair includes:
mapping at least one node of a first flow in the identified candidate flow pair into at least one node of a second flow in the identified candidate flow pair; and
extracting a single maximal duplicated code pattern based at least in part on the mapping.

6. The method of claim 5, wherein the mapping is based at least in part on at least one of: inclusion variables, mapping variables, or control-flow variables.

7. The method of claim 1, wherein detecting the similar code portion pattern duplicated among the group of graph based visual programming language code instances includes de-duplicating flows within a set of flows prior to determining that the at least one candidate flow pair exists.

8. The method of claim 7, wherein de-duplicating the flows within the set of flows includes identifying isomorphic patterns including by at least one of:
using a group hash; or
sorting combined label concatenation including by:
computing a key for a flow, wherein the key includes a sorted concatenation of combined labels of edges in the flow;
determining that there exists an isomorphic flow within a set of flows among those with a same key; and
extracting an isomorphic pattern in response to determining that there exists a flow within the set of flows among those with a same key.

9. The method of claim 1, further comprising, after obtaining the identified candidate flow pair, applying at least one pre-processing rule to reduce a size of the group of graph based visual programming language code instances.

10. The method of claim 1, wherein the index includes an inverted index and further comprising:
tokenizing at least one flow including by combining edge labels, wherein the combined edge labels include a concatenation of a node label of a first node, an edge label of an edge, and a node label of a second node combining the first node and the second node; and
building the inverted index for a set of flows using the tokenized at least one flow.

11. The method of claim 10, wherein only pairs of graphs in the repository of graph based visual programming language code instances that occur in a same index list associated with the inverted index are used during initialization of a queue and adding a new pattern to the inverted index prior to updating the queue.

12. The method of claim 1, further comprising:
obtaining a tree hierarchy of similar code portion patterns including the detected similar code portion pattern.

13. The method of claim 12, further comprising:
determining refactoring steps based at least in part on the tree hierarchy of the similar code portion patterns.

14. The method of claim 1, wherein visually indicating elements belonging to the detected similar code portion pattern includes displaying the detected similar code portion pattern within an architecture dashboard.

15. The method of claim 1, wherein visually indicating elements belonging to the detected similar code portion pattern includes displaying the detected similar code portion pattern within a ranked list of patterns.

16. The method of claim 15, wherein the ranked list of patterns is ordered by recommended refactoring order.

17. The method of claim 1, further comprising outputting guidance for refactoring code based at least in part on the detected similar code portion pattern.

18. A system, comprising:
a processor configured to:
analyze a repository of graph based visual programming language code instances;
detect a similar code portion pattern duplicated among a group of graph based visual programming language code instances included in the repository of graph based visual programming language code instances including by being configured to:
use an index and tokenizing a flow corresponding to at least one graph based visual programming language code instance in the group of graph based visual programming language code instances;
determine that at least one candidate flow pair exists;
in response to determining that the at least one candidate flow pair exists, obtain an identified candidate flow pair;
extract a duplicated code pattern for the identified candidate flow pair; and
replace the identified candidate flow pair with the extracted duplicated code pattern; and
within a visual representation of at least one of the group of graph based visual programming language code instances, visually indicate elements belonging to the detected similar code portion pattern; and
a memory coupled to the processor and configured to provide the processor with instructions.

19. The system of claim 18, wherein the replacement of the identified candidate flow pair with the extracted duplicated code pattern is based at least in part on a refactor weight associated with the extracted duplicated code pattern meeting a threshold.

20. A computer program product embodied in a non-transitory computer readable medium and comprising computer instructions for:
analyzing a repository of graph based visual programming language code instances;
detecting a similar code portion pattern duplicated among a group of graph based visual programming language code instances included in the repository of graph based visual programming language code instances including by:
using an index and tokenizing a flow corresponding to at least one graph based visual programming language code instance in the group of graph based visual programming language code instances;
determining that at least one candidate flow pair exists;
in response to determining that the at least one candidate flow pair exists, obtaining an identified candidate flow pair;
extracting a duplicated code pattern for the identified candidate flow pair; and
replacing the identified candidate flow pair with the extracted duplicated code pattern; and
within a visual representation of at least one of the group of graph based visual programming language code instances, visually indicating elements belonging to the detected similar code portion pattern.

* * * * *

UNITED STATES PATENT AND TRADEMARK OFFICE
CERTIFICATE OF CORRECTION

| | |
|---|---|
| PATENT NO. | : 11,662,998 B2 |
| APPLICATION NO. | : 17/350362 |
| DATED | : May 30, 2023 |
| INVENTOR(S) | : Miguel Ângelo da Terra Neves et al. |

It is certified that error appears in the above-identified patent and that said Letters Patent is hereby corrected as shown below:

On the Title Page

Item (71), applicant, name, delete "OutSystems—Software em Rede, S.A." and insert --OutSystems - Software em Rede, S.A.--, therefor.

Item (73), assignee, name, delete "OutSystems—Software em Rede, S.A." and insert --OutSystems - Software em Rede, S.A.--, therefor.

Item (73), assignee, address, after "OutSystems - Software em Rede, S.A.", insert --(PT)--.

In page 3, Column 1, item (56), other publications, cite no. 23, delete "Jeremias Rößer" and insert --Jeremias Rößler, therefor.

In page 3, Column 2, item (56), other publications, cite no. 2, after "Komondoor", delete "et al," and insert --et al.,--, therefor.

In page 3, Column 2, item (56), other publications, cite no. 12, delete "Repairat" and insert --Repair at--, therefor.

In page 3, Column 2, item (56), other publications, cite no. 23, delete "pp.347-652" and insert --pp.647-652--, therefor.

In the Specification

In Column 2, Line(s) 50, delete "is" and insert --are--, therefor.

Signed and Sealed this
Twenty-first Day of November, 2023

Katherine Kelly Vidal
*Director of the United States Patent and Trademark Office*